(12) United States Patent
Ray et al.

(10) Patent No.: US 9,048,031 B2
(45) Date of Patent: Jun. 2, 2015

(54) METHOD OF AND PRINTABLE COMPOSITIONS FOR MANUFACTURING A MULTILAYER CARBON NANOTUBE CAPACITOR

(71) Applicant: NthDegree Technologies Worldwide Inc., Tempe, AZ (US)

(72) Inventors: William Johnstone Ray, Fountain Hills, AZ (US); Neil O. Shotton, Tempe, AZ (US); Vera Nicholaevna Lockett, Phoenix, AZ (US); Theodore I. Kamins, Palo Alto, CA (US); Thomas William Clinton, Danville, CA (US); Mark David Lowenthal, Gilbert, AZ (US)

(73) Assignee: NthDegree Technologies Worldwide Inc., Tempe, AZ (US)

( * ) Notice: Subject to any disclaimer, the term of this patent is extended or adjusted under 35 U.S.C. 154(b) by 0 days.

(21) Appl. No.: 14/201,059

(22) Filed: Mar. 7, 2014

(65) Prior Publication Data

US 2014/0182099 A1    Jul. 3, 2014

Related U.S. Application Data

(62) Division of application No. 13/025,138, filed on Feb. 10, 2011, now abandoned.

(60) Provisional application No. 61/306,162, filed on Feb. 19, 2010.

(51) Int. Cl.
*H01G 4/00* (2006.01)
*H01G 11/84* (2013.01)
(Continued)

(52) U.S. Cl.
CPC ............... *H01G 11/84* (2013.01); *B82Y 25/00* (2013.01); *B82Y 30/00* (2013.01); *B82Y 40/00* (2013.01);
(Continued)

(58) Field of Classification Search
None
See application file for complete search history.

(56) References Cited

U.S. PATENT DOCUMENTS 5,800,706 A    9/1998    Fischer
6,837,928 B1   1/2005    Zhang et al.
(Continued)

FOREIGN PATENT DOCUMENTS

WO    WO 2009126382 A2    10/2009

OTHER PUBLICATIONS

Patrice Simon & Yury Gogotsi, Materials for electrochemical capacitors, Nature Materials, Nov. 2008, pp. 845-854, vol. 7, Macmillan Publishers Limited.
(Continued)

*Primary Examiner* — Binh X Tran
*Assistant Examiner* — David Cathey, Jr.
(74) *Attorney, Agent, or Firm* — Nancy R. Gamburd; Gamburd Law Group LLC

(57) ABSTRACT

Multilayer carbon nanotube capacitors, and methods and printable compositions for manufacturing multilayer carbon nanotubes (CNTs) are disclosed. A first capacitor embodiment comprises: a first conductor; a plurality of fixed CNTs in an ionic liquid, each fixed CNT comprising a magnetic catalyst nanoparticle coupled to a carbon nanotube and further coupled to the first conductor; and a first plurality of free CNTs dispersed and moveable in the ionic liquid. Another capacitor embodiment comprises: a first conductor; a conductive nanomesh coupled to the first conductor; a first plurality of fixed CNTs in an ionic liquid and further coupled to the conductive nanomesh; and a plurality of free CNTs dispersed and moveable in the ionic liquid. Various methods of printing the CNTs and other structures, and methods of aligning and moving the CNTs using applied electric and magnetic fields, are also disclosed.

20 Claims, 19 Drawing Sheets

(51) Int. Cl.

| | | |
|---|---|---|
| *B82Y 25/00* | (2011.01) | |
| *B82Y 30/00* | (2011.01) | |
| *B82Y 40/00* | (2011.01) | |
| *H01G 9/04* | (2006.01) | |
| *H01G 11/36* | (2013.01) | |
| *H01G 11/86* | (2013.01) | |
| *H01G 11/58* | (2013.01) | |
| *H01F 1/00* | (2006.01) | |

(52) U.S. Cl.
CPC .............. *H01F 1/0045* (2013.01); *H01G 9/058* (2013.01); *H01G 11/36* (2013.01); *H01G 11/86* (2013.01); *Y02E 60/13* (2013.01); *H01G 11/58* (2013.01)

(56) References Cited

U.S. PATENT DOCUMENTS

| | | | |
|---|---|---|---|
| 6,975,063 | B2 | 12/2005 | Mao et al. |
| 7,335,290 | B2 | 2/2008 | Miyagi et al. |
| 7,852,612 | B2 | 12/2010 | Zhao |
| 7,931,885 | B2* | 4/2011 | Lin et al. .................... 423/447.1 |
| 2005/0016839 | A1* | 1/2005 | Horne et al. ................. 204/242 |
| 2005/0250305 | A1* | 11/2005 | Al-Rabadi .................... 438/614 |
| 2006/0115711 | A1 | 6/2006 | Kim et al. |
| 2007/0258192 | A1 | 11/2007 | Schindall et al. |
| 2008/0049380 | A1 | 2/2008 | Miyahara et al. |
| 2008/0192407 | A1 | 8/2008 | Lu et al. |
| 2008/0199778 | A1 | 8/2008 | Hirata et al. |
| 2009/0176112 | A1* | 7/2009 | Kruckenberg et al. ....... 428/457 |
| 2009/0253590 | A1* | 10/2009 | Murakoshi et al. ............ 506/22 |
| 2009/0280242 | A1 | 11/2009 | Winarski |
| 2010/0177475 | A1 | 7/2010 | Min et al. |
| 2011/0171534 | A1 | 7/2011 | Lampert et al. |
| 2011/0205688 | A1* | 8/2011 | Ray et al. ....................... 361/502 |
| 2011/0235240 | A1 | 9/2011 | Lu et al. |
| 2011/0256451 | A1 | 10/2011 | Cui et al. |
| 2011/0261502 | A1 | 10/2011 | Gruner |

OTHER PUBLICATIONS

Jinyong Wang et al., Why Single-Walled Carbon Nanotubes Can Be Dispersed in Imidazolium-Based Ionic Liquids, ACS Nano, Dec. 1, 2008, pp. 2540-2546, vol. 2, No. 12, American Chemical Society.

Celine Largeot et al., Relation between the Ion size and Pore Size for an Electric Double-Layer Capacitor, J. Am. Chem. Soc. 2008, pp. 2730-271, vol. 130, American Chemical Society.

Victor L. Pushparaj et al., Flexible energy storage devices based on nanocomposite paper, PNAS, Aug. 21, 2007, pp. 13574-13577, vol. 107, No. 34, The National Academy of Sciences of the USA.

J. Chmiola et al., Anomalous Increase in Carbon Capacitance at Pore Sizes Less Than 1 Nanometer, Science, Sep. 22, 2006, pp. 1760-1763, vol. 313, American Association for the Advancement of Science.

J. M. Boyea et al., Carbon Nanotube-Based Supercapacitors: Technologies and Markets, Nanotechnology Law & Business, Mar. 2007, pp. 585-593, vol. 4, No. 1.

Wen Lu et al., High performance electrochemical capacitors from aligned carbon nanotube electrodes and ionic liquid electrolytes, Journal of Power Sources, 2009, pp. 1270-1277, vol. 189.

Martti Kaempgen et al., Printable Thin Film Supercapacitors Using Single-Walled Carbon Nanotubes, Nano Letters, Apr. 6, 2009, pp. A-E, vol. xx, No. x, American Chemical Society.

Carole A. Cooper et al., Distribution and alignment of carbon nanotubes and nanofibrils in a polymer matrix, Composites Science and Technology, 2002, pp. 1105-1112, vol. 62, Elsevier Science Ltd.

W. E. Teo et al., A review on electrospinning design and nanofibre assemblies, Nanotechnology, 2006, pp. R89-R106, vol. 17, Institute of Physics Publishing Ltd.

S. Arepalli et al., Carbon-Nanotube-Based Electrochemical Double-Layer Capacitor Technologies for Spaceflight Applications, JOM Dec. 2005, pp. 26-31.

Hongjie Dai et al., Carbon Nanotubes: Synthesis, Integration, and Properties, Acc. Chem. Res., 2002, pp. 1035-1044, vol. 35, No. 12, American Chemical Society.

S. Kondrat et al., Superionic state in double-layer capacitors with nanoporous electrodes, J. Phys.: Condens. Matter, 2011, pp. 1-5, vol. 23, IOP Publishing Ltd.

Chunming Niu et al., High power electrochemical capacitors based on carbon nanotube electrodes, Appl. Phys. Lett., Mar. 17, 1997, pp. 1480-1482, vol. 70, No. 11, American Institute of Physics.

Neal R. Scruggs et al., Rectification of the Ionic Current through Carbon Nanotubes by Electrostatic Assembly of Polyelectrolytes, Nano Letters 2009, pp. 3853-3859, vol. 9, No. 11, American Chemical Society.

Deborah Halber, Researchers Fired up over new Battery, Tech Talk, Laboratory for Electromagnetic and Electronic Systems, p. 1, http://lees.mit.edu/lees/battery_001.htm.

Michael Mullaney, Beyond batteries: Storing power in a sheet of paper, http://www.eurekalert.org/pub_releases/2007-08/rpi-bbs080907.php, pp. 1-3, Rensselaer Polytechnic Institute.

Methods Reduce Cost, Enhance Quality of Nanotubes, Industrial Productivity, Spinoff 2009, pp. 136-137.

PCT International Preliminary Report on Patentability, PCT/US2011/024418, Aug. 21, 2012, The International Bureau of WIPO.

Jay Fitzgerald, Charged up by batteries, Laboratory for Electromagnetic and Electronic Systems, p. 2, http://lees.mit.edu/lees/battery_002.htm.

Sandeep Razdan et al., Ionically Self-Assembled Polyelectrolyte-Based Carbon Nanotube Fibers, Chem. Mater. Jun. 18, 2009, pp. 3062-3071, vol. 21, No. 14, American Chemical Society.

Zejian Liu et al., A direct method to determine the chiral indices of carbon nanotubes, Chemical Physics Letters, Apr. 25, 2005, pp. 75-79, vol. 408, Elsevier B.V.

Hiroki Usui et al., Improved dye-sensitized solar cells using ionic nanocomposite gel electrolytes, Journal of Photochemistry and Photobiology A: Chemistry, 2004, pp. 97-101, vol. 164, Elsevier B.V.

Takanori Fukushima et al., Ionic Liquids for Soft Functional Materials with Carbon Nanotubes, Chemistry-A European Journal, Jun. 15, 2007, pp. 5048-5058, vol. 13, No. 18, Wiley-VCH Verlag GMbH & Co., Weinheim.

* cited by examiner

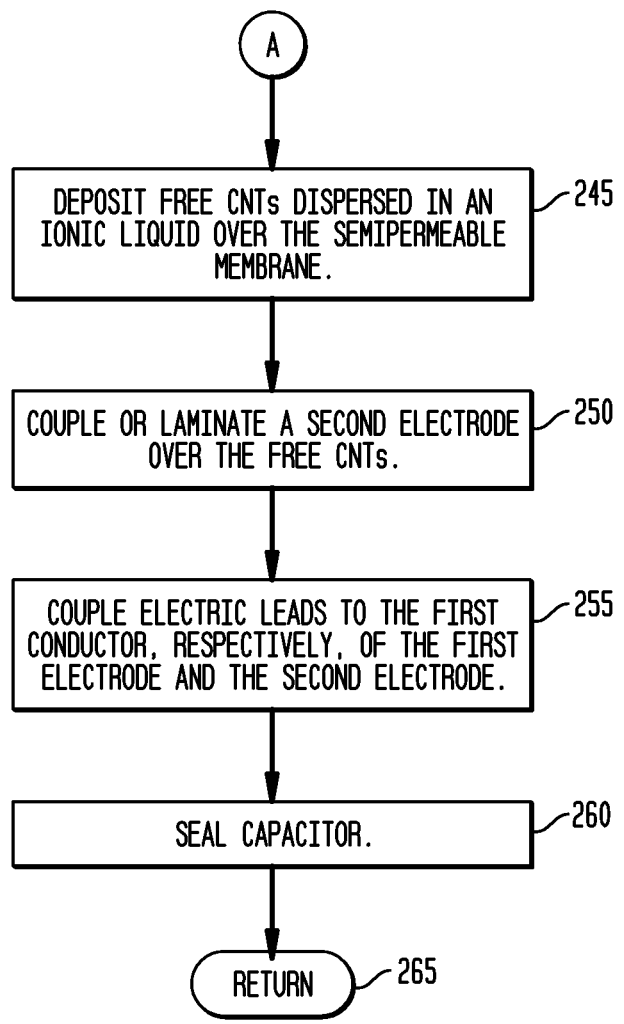

METHOD OF AND PRINTABLE COMPOSITIONS FOR MANUFACTURING A MULTILAYER CARBON NANOTUBE CAPACITOR

CROSS-REFERENCE TO A RELATED APPLICATION

This application is division of and claims priority to U.S. patent application Ser. No. 13/025,138, filed Feb. 10, 2011, now abandoned, inventors William Johnstone Ray et al., entitled "Method of and Printable Compositions for Manufacturing a Multilayer Carbon Nanotube Capacitor", which is a nonprovisional of and further claims priority under 35 U.S.C. Section 119 to U.S. Provisional Patent Application No. 61/306,162, inventors William Johnstone Ray et al., entitled "System, Method and Apparatus for Printable Capacitors", which are commonly assigned herewith, the entire contents of which are incorporated herein by reference with the same full force and effect as if set forth in their entirety herein, and with priority claimed for all commonly disclosed subject matter.

FIELD OF THE INVENTION

The present invention in general is related to energy storage technology and, in particular, is related to a multilayer carbon nanotube-based capacitor and methods of and printable compositions for manufacturing a multilayer carbon nanotube-based capacitor.

BACKGROUND OF THE INVENTION

Current research into electrochemical supercapacitors (also referred to as ultracapacitors or electric double layer capacitors ("EDLCs")), has revealed that these devices may be promising local energy storage devices. Other available energy storage technologies such as the Faradaic battery and conventional dielectric capacitors have drawbacks. Batteries are characterized by high energy density, low power density, and short cycle life, while dielectric capacitors are low energy density, high power density and have a long cycle life. In contrast, supercapacitors potentially may be characterized by mid-range energy storage capability, high power density and long cycle life.

Three general types of supercapacitors may be identified, such as: (1) carbon-based active materials that store charge via high surface area; (2) oxidation-reduction ("redox" or pseudo-capacitors) which use fast and reversible surface or near surface reactions for charge storage (such as via transition metal oxides or conducting organic polymers); and (3) hybrid capacitors that combine capacitive or pseudo-capacitive electrodes with battery electrodes.

Carbon-based high surface area supercapacitors store electricity by physical charge separation. Supercapacitor charge is stored through reversible ion adsorption on high surface area electrodes. Carbon nanotubes ("CNTs") (such as single-walled carbon nanotubes ("SWCNTs") and multi-walled carbon nanotubes ("MWCNTs")) and carbon fibers have been explored for use in the electrodes of such carbon-based, high surface area supercapacitors, typically forming an intertwined, matted or entangled mesh layer limiting the available surface area for ion adsorption on the exterior of the fibers or nanotubes, and further having a very large variation in pore size.

Other attempts to use carbon nanotubes have included use of aligned CNTs having either a closed (capped) or an open (or uncapped) end, but have proved extraordinarily difficult to manufacture and scale up to commercial quantities. For example, capped CNTs have been grown directly on electrode plates to achieve some alignment; in another instance, carbon nanotubes have been aligned by growth of the CNTs through vacuum chemical vapor deposition on a silicon wafer substrate, then metallized and transferred by hand to an electrode using a double-sided conducting tape, followed by plasma etching to uncap and open the ends and etch mesopores in the CNTs. While theoretically feasible, such alignment methods based on the growth of the CNTs are not practical beyond a laboratory environment. Further, such complicated CNT and capacitor fabrication processes are prohibitively expensive, are not scalable and have not been able to achieve commercial production. Such capacitor structures have not fully exploited the interior surfaces of the CNTs and the potential pore sizes of CNTs, have not addressed other methods of producing CNTs and the post-growth alignment of CNTs, and have not addressed specific energy density limitations of the resulting capacitors.

Accordingly, a need remains for methods of manufacturing a CNT-based capacitor using readily available commercial methods for fabricating CNTs and using post-growth alignment of the CNTs. Such a CNT-based capacitor should exploit the interior surfaces of the CNTs and the potential pore sizes of CNTs. Such a CNT-based capacitor should be capable of being manufactured at a commercial scale and comparatively low cost, while simultaneously providing comparatively high power density, high energy density, and long cycle life.

SUMMARY

The exemplary capacitor embodiments have a structure different from the structures of prior art capacitors, a different fabrication method, and different compositions of matter. Various exemplary capacitor embodiments have an additional layer, namely, free CNTs which are translationally and/or rotationally moveable in an ionic liquid 140. Many of the exemplary capacitor embodiments have a secondary support structure for the fixed CNTs, which provides a second support to the fixed CNTs at a second location which is separate and spaced apart from a first support location, such as the substrate. The fixed CNTs and the free CNTs are uncapped at least at one end, and have an interior diameter matched to be slightly greater than the ion size of a selected ionic liquid. The fixed CNTs have not been grown on an electrode or transferred directly from a growth plate, but have been dispersed in an ionic liquid and deposited with an irregular spacing over a first conductor, a conductive substrate, or a conductive nanomesh. In many embodiments, CNT-magnetic catalyst nanoparticle structures are aligned and moved by a magnetic field to couple the magnetic catalyst nanoparticles to the first conductor or conductive substrate. The CNT-magnetic catalyst nanoparticle structures in an ionic liquid also comprise a new and novel composition of matter. A novel conductive nanomesh comprised of deposited nanorods is utilized in exemplary embodiments for coupling CNTs to form fixed CNTs. Various exemplary capacitors provide greater energy density (or specific energy) than a traditional capacitor, and include a superposition of energy contributions from multiple sources, yielding a device which also exhibits characteristics of a traditional battery while still having the comparatively higher specific power (or power density) and longer cycle life of a traditional capacitor.

An exemplary capacitor comprises: a first conductor; a first plurality of fixed carbon nanotubes in an ionic liquid, each fixed carbon nanotube comprising a magnetic catalyst nanoparticle coupled to a carbon nanotube and further coupled to the first conductor; and a first plurality of free carbon nanotubes dispersed and moveable in the ionic liquid.

In an exemplary embodiment, for each fixed carbon nanotube of the first plurality of fixed carbon nanotubes, the magnetic catalyst nanoparticle coupled to the first conductor supports the carbon nanotube at a first location, and the capacitor further comprises: a support structure coupled to the first conductor and supporting one or more fixed carbon nanotubes of the first plurality of fixed carbon nanotubes at least at one or more second locations separate from and spaced apart from the first location. The support structure may be separate and distinct from the first plurality of fixed carbon nanotubes.

An exemplary support structure is a nanofiber support structure, which may be formed by electrospinning a polymer. In various exemplary embodiments, the polymer is at least one polymer selected from the group consisting of: polypyrolle; polianiline; polythiophene; polyterthiophene; derivatives of polythiophene and polyterthiophene; poly(3,4-ethylenedioxythiophene) (PEDOT); poly(3-(4-fluorophenyl) thiophene) (MPFT); poly(3-(3,4-difluorophenyl)thiophene) (MPFT); poly(3-(4-trifluoromethylphenyl)-thiophene) (PT-FMPT); poly(1-cyano-2-(2-(3,4-ethylenedioxylthienyl))-1-(2-thienyl)vinylene (ThCNVEDT); poly(3-methyl thiophene)(PMeT); and mixtures thereof. Another exemplary support structure is a screen and is spaced apart from the first conductor. In exemplary embodiments, the first conductor is coupled to a substrate or the first conductor is a conductive substrate. Another exemplary support structure is a plurality of elongated extensions or pillars extending from the substrate, or the first conductor, or the conductive substrate. Another exemplary support structure is a plurality of walls or sides of a plurality of cavities of the substrate, or the first conductor, or the conductive substrate.

In exemplary embodiments, for each fixed carbon nanotube, the magnetic catalyst nanoparticle is coupled to the carbon nanotube at a first end of the carbon nanotube, and each fixed carbon nanotube is open or uncapped at a second end opposite the first end coupled to the magnetic catalyst nanoparticle. In exemplary embodiments, each carbon nanotube of the first plurality of free carbon nanotubes is open or uncapped at least at one end. In exemplary embodiments, each fixed carbon nanotube of the first plurality of fixed carbon nanotubes is single-walled and each carbon nanotube of the first plurality of free carbon nanotubes is multi-walled or single-walled.

In various exemplary embodiments, each fixed carbon nanotube of the first plurality of fixed carbon nanotubes is substantially perpendicular to the plane of the first conductor.

In exemplary embodiments, each carbon nanotube of the first plurality of fixed carbon nanotubes and each carbon nanotube of the first plurality of free carbon nanotubes has an interior diameter greater than a Helmholtz diameter of an ion of the ionic liquid. In other exemplary embodiments, each carbon nanotube of the first plurality of fixed carbon nanotubes and each carbon nanotube of the first plurality of free carbon nanotubes has an interior diameter between about 0.5 nm and 1.5 nm.

In various exemplary embodiments, the ionic liquid is at least one ionic liquid selected from the group consisting of: butyltrimethylammonium bis(trifluoromethylsulfonyl) imide, 1-ethyl-3-methylimidazolium bis(trifluoromethylsulfonyl)imide, 1-methyl-3-propylimidazolium bis(trifluoromethylsulfonyl)imide, 1-hexyl-3-methylimidazolium bis (trifluoromethylsulfonyl)imide, 1-methyl-3-propylimidazolium iodide, 1-ethyl-3-methylimidazolium thiocyanate, 1-methyl-1-propylpiperidinium bis(trifluoromethylsulfonyl)imide, 1-butyl-2-methylpyridinium bis(trifluoromethylsulfonyl)imide, 1-butyl-4-methylpyridinium bis(trifluoromethylsulfonyl)imide, 1-butyl-1-methylpyrrolidinium bis(trifluoromethylsulfonyl)imide, diethylmethylsulfonium bis(trifluoromethylsulfonyl)imide, lithium bis(trifluoromethylsulfonyl)imide, and mixtures thereof.

In exemplary embodiments, the magnetic catalyst nanoparticle is at least one catalyst selected from the group consisting of: cobalt, molybdenum, nickel, iron, ruthenium, mixtures thereof alloys thereof and their compounds. In various exemplary embodiments, at least some of the carbon nanotubes of the first plurality of fixed carbon nanotubes and at least some of the carbon nanotubes of the first plurality of free carbon nanotubes has a chirality of (n, m) where n=m or where the quotient of m minus n is divided by three ((m−n)/3) is an integer.

In various exemplary embodiments, the capacitor further comprises a semipermeable membrane, such as polytetrafluoroethylene (PTFE).

In exemplary embodiments, the first plurality of free carbon nanotubes are not coupled to the first conductor, are not coupled to the first plurality of fixed carbon nanotubes, and are not coupled to the semipermeable membrane. Instead, the first plurality of free carbon nanotubes are translationally and rotationally moveable in the ionic liquid.

In various exemplary embodiments, the first plurality of fixed carbon nanotubes and the first conductor form a first electrode, and the capacitor further comprises: a semipermeable membrane between the first electrode and a second electrode, the second electrode comprising: a second conductor; a second plurality of fixed carbon nanotubes in the ionic liquid, each fixed carbon nanotube comprising a magnetic catalyst nanoparticle coupled to a carbon nanotube and further coupled to the second conductor; and a second plurality of free carbon nanotubes moveable in the ionic liquid.

Various methods of fabricating a capacitor are also disclosed. An exemplary method comprises: depositing a plurality of carbon nanotube-magnetic catalyst nanoparticle structures dispersed in an ionic liquid over a first conductor, each carbon nanotube-magnetic catalyst nanoparticle structure comprising a carbon nanotube coupled to a magnetic catalyst nanoparticle; using an applied magnetic field, aligning and moving the plurality of CNT-magnetic catalyst nanoparticle structures toward the first conductor; coupling the magnetic catalyst nanoparticles to the first conductor to form a first plurality of fixed carbon nanotubes; and depositing a first plurality of carbon nanotubes dispersed and moveable in an ionic liquid over the first plurality of fixed carbon nanotubes to form a first plurality of free carbon nanotubes.

In exemplary embodiments, prior to the step of depositing a plurality of carbon nanotube-magnetic catalyst nanoparticle structures, the method further comprises: providing a support structure coupled to the first conductor. In various exemplary embodiments, the step of providing a support structure further comprises: electrospinning a polymer over the first conductor to form the support structure. In other exemplary embodiments, the step of providing a support structure further comprises: attaching a screen or a mesh structure over and spaced apart from the first conductor. In various exemplary embodiments, the step of aligning and moving the plurality of CNT-magnetic catalyst nanoparticle structures toward the first conductor further comprises: using the applied magnetic field, aligning and moving the plurality of CNT-magnetic catalyst nanoparticle structures through the support structure and toward the first conductor, or rotating and translating the plurality of CNT-magnetic catalyst nanoparticle structures toward the first conductor.

The exemplary method may further comprise: applying solder over the first conductor. The step of coupling the magnetic catalyst nanoparticles to the first conductor to form a first plurality of fixed carbon nanotubes may further comprise: heating the magnetic catalyst nanoparticles, the solder and the first conductor to bond the magnetic catalyst nanoparticles to the first conductor. The exemplary method may further comprise etching the first conductor.

The exemplary method may further comprise: coupling a semipermeable membrane over the first plurality of free carbon nanotubes; depositing a second plurality of carbon nanotubes dispersed and moveable in an ionic liquid over the semipermeable membrane to form a second plurality of free carbon nanotubes; and attaching a second electrode over the second plurality of free carbon nanotubes, the second electrode comprising a second plurality of fixed carbon nanotubes coupled to a second conductor.

In various exemplary embodiments, the step of depositing the plurality of carbon nanotube-magnetic catalyst nanoparticle structures may further comprise printing the plurality of carbon nanotube-magnetic catalyst nanoparticle structures dispersed in an ionic liquid over the first conductor. Also in various exemplary embodiments, the step of depositing the plurality of carbon nanotube-magnetic catalyst nanoparticle structures may further comprise printing the first plurality of carbon nanotubes dispersed and moveable in an ionic liquid over the first plurality of fixed carbon nanotubes.

In exemplary embodiments, a printable carbon nanotube composition comprises: an ionic liquid; and a plurality of carbon nanotube-magnetic catalyst nanoparticle structures dispersed in the ionic liquid, each carbon nanotube-magnetic catalyst nanoparticle structure comprising a carbon nanotube coupled to a magnetic catalyst nanoparticle.

In another exemplary embodiment, a capacitor comprises: a first conductor; a first conductive nanomesh coupled to the first conductor; a first plurality of fixed carbon nanotubes in an ionic liquid and further coupled to the first conductive nanomesh; and a first plurality of free carbon nanotubes dispersed and moveable in the ionic liquid.

In an exemplary embodiment, the first conductive nanomesh is metallic. In another exemplary embodiment, the first conductive nanomesh comprises gold or palladium nanorods. In another exemplary embodiment, the first conductive nanomesh comprises metallic nanorods having a diameter of less than about 100 nm and a length between about 200 nm and about 1.0 microns.

In various exemplary embodiments, each fixed carbon nanotube of the first plurality of fixed carbon nanotubes is substantially perpendicular to the plane of the first conductor. In various exemplary embodiments, at least some of the carbon nanotubes of the first plurality of fixed carbon nanotubes are metallic, conductive or ballistic.

In an exemplary embodiment, the first plurality of fixed carbon nanotubes, the first conductive nanomesh and the first conductor form a first electrode, and wherein the capacitor further comprises: a semipermeable membrane between the first electrode and a second electrode, the second electrode comprising: a second conductor; a second conductive nanomesh coupled to the second conductor; a second plurality of fixed carbon nanotubes in an ionic liquid and further coupled to the second conductive nanomesh; and a second plurality of free carbon nanotubes dispersed and moveable in the ionic liquid.

Another exemplary method of fabricating a capacitor is disclosed. The exemplary method comprises: depositing a plurality of conductive nanorods over a first conductor to form a first conductive nanomesh; depositing a first plurality of carbon nanotubes dispersed in an ionic liquid over the first conductive nanomesh and the first conductor; using an applied electric field and an applied magnetic field, aligning and moving at least some of the carbon nanotubes of the first plurality of carbon nanotubes into the nanomesh and toward the first conductor; coupling at least some of the carbon nanotubes to the conductive nanomesh or to the first conductor to form a first plurality of fixed carbon nanotubes; and depositing a second plurality of carbon nanotubes dispersed and moveable in an ionic liquid over the first plurality of fixed carbon nanotubes to form a first plurality of free carbon nanotubes.

In various exemplary embodiments, the coupling step may further comprise applying heat to at least some of the carbon nanotubes, to the conductive nanomesh, and to the first conductor to form the first plurality of fixed carbon nanotubes. In another exemplary embodiment, the coupling step may further comprise sintering at least some of the carbon nanotubes to the conductive nanomesh or to the first conductor to form the first plurality of fixed carbon nanotubes.

In various exemplary embodiments, the step of aligning and moving may further comprise rotating and translating at least some of the carbon nanotubes of the first plurality of carbon nanotubes into the nanomesh and toward the first conductor.

The exemplary method may further comprise etching the first conductor; coupling a semipermeable membrane over the first plurality of free carbon nanotubes; and depositing a third plurality of carbon nanotubes dispersed and moveable in an ionic liquid over the semipermeable membrane to form a second plurality of free carbon nanotubes.

In various exemplary embodiments, the first plurality of fixed carbon nanotubes coupled to the conductive nanomesh or the first conductor comprises a first electrode, and the exemplary method may further comprise attaching a second electrode over the second plurality of free carbon nanotubes, the second electrode comprising a second plurality of fixed carbon nanotubes coupled to a second conductive nanomesh or to a second conductor.

In various exemplary embodiments, the step of depositing the first plurality of carbon nanotubes may further comprise printing the plurality of carbon nanotubes dispersed in an ionic liquid over the first conductive nanomesh and the first conductor.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIG. 10, divided into FIGS. 10A and 10B, is a flow chart illustrating a first method of fabricating an exemplary multilayer carbon nanotube-based capacitor.

FIG. 15, divided into

DETAILED DESCRIPTION OF EXEMPLARY EMBODIMENTS

Figure 1:
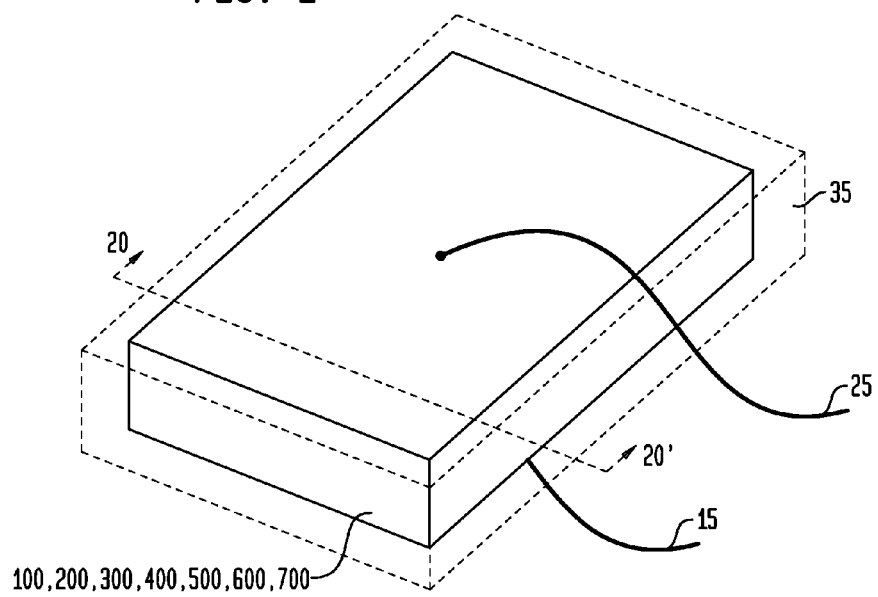
FIG. 1 is a perspective view illustrating an exemplary capacitor embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

FIG. 1 is a perspective view illustrating an exemplary capacitor 100, 200, 300, 400, 500, 600, 700 embodiment. As illustrated, such an exemplary capacitor 100, 200, 300, 400, 500, 600, 700 is sealed or encapsulated with a sealant 35, to both provide electrical insulation and to prevent leakage of internal contents or components, such as CNTs and liquids. Also as illustrated, external leads (or wires) 15, 25 are provided for electrical contact with the corresponding capacitor electrodes (discussed in greater detail below). The sealant 35 and leads 15, 25 may be provided as known or becomes known in the electronic arts. The exemplary capacitor 100, 200, 300, 400, 500, 600, 700 may be stacked and wired in parallel or in series, and may perform as a capacitor, or a battery replacement, or as a fixed electrical "buffer" storage for distributed power systems. The exemplary capacitor 100, 200, 300, 400, 500, 600, 700 is illustrated as having a substantially flat form factor for ease of explanation, and those having skill in the electronic arts will understand that the exemplary capacitor 100, 200, 300, 400, 500, 600, 700 may have any of various forms, such as rolled, folded, etc., and any and all such shapes and sizes are considered equivalent and within the scope of the disclosure. For example and as discussed in greater detail below, an exemplary capacitor 100, 200, 300, 400, 500, 600, 700 may be formed through a printing process on comparatively large, flexible sheets of a substrate 105, such that the exemplary capacitor 100, 200, 300, 400, 500, 600, 700 may also be flexible and formed into a wide variety of shapes for any intended purpose.

Also as discussed in greater detail below, the various exemplary capacitors 100, 200, 300, 400, 500, 600, 700 differ from each other based upon various internal structures and compositions, which may be selected or combined in any combination, with all such combinations also considered equivalent and within the scope of the disclosure. It should be noted that the various cross-sectional views of FIGS. 2 and 5-9 do not illustrate the sealant (or sealing layer) 35 or the leads 15, 25, and those having skill in the art will recognize that those features are readily added to any of the exemplary capacitors 100, 200, 300, 400, 500, 600, 700. It also should be noted that the various cross-sectional views of FIGS. 2 and 5-9 are exploded views for purposes of illustration and are not drawn to scale, with any physical capacitors 100, 200, 300, 400, 500, 600, 700 being considerably more compact and typically formed into any of a plurality of shapes and sizes.

Figure 2:
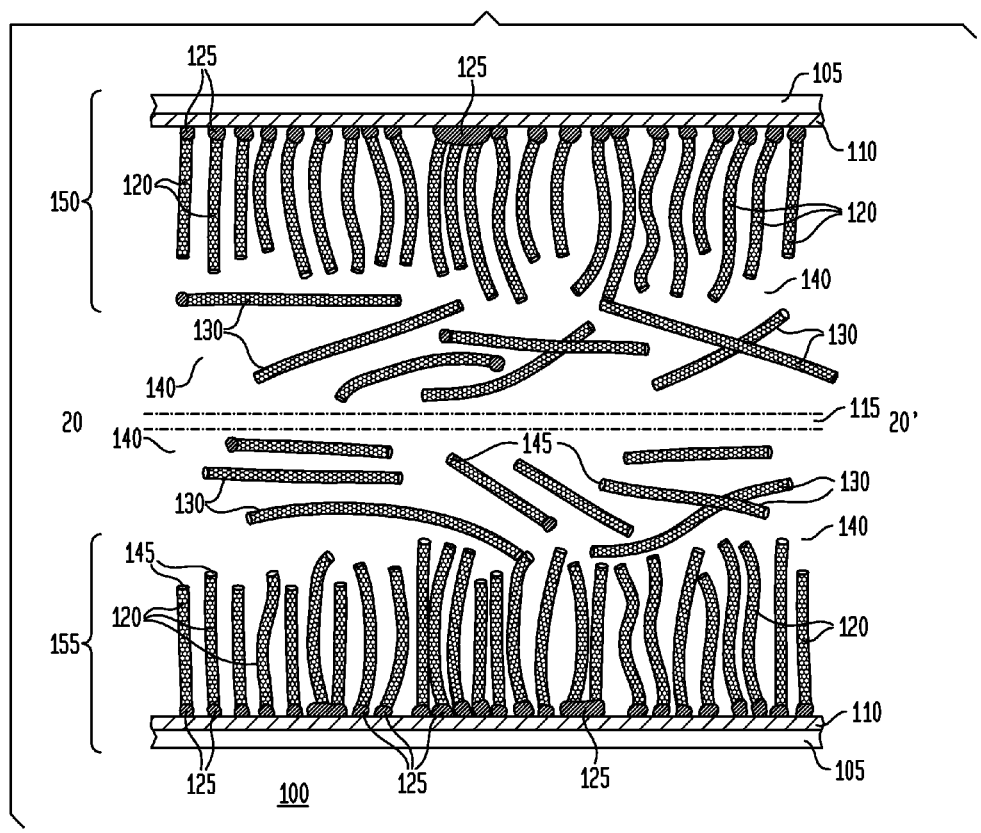
FIG. 2 is a cross-sectional view illustrating an exemplary first capacitor embodiment.

FIG. 2 is a cross-sectional view (through the 20-20' plane of FIG. 1) illustrating an exemplary first capacitor 100 embodiment. Exemplary first capacitor 100 comprises two different types of carbon nanotube ("CNT") structures, fixed CNTs 120, 120A (which are fixed, coupled or attached to a first conductor 110) and free (unattached, uncoupled or free floating) CNTs 130, both in an ionic liquid 140. The fixed CNTs 120, 120A and the free CNTs 130 may be single-walled (SWCNTs) or multi-walled (MWCNTs). In an exemplary embodiment, the fixed CNTs 120, 120A are typically single-walled and the free CNTs 130 are typically MWCNTs or a mixture of MWCNTs and SWCNTs. The fixed CNTs 120 and free CNTs 130 may have any chirality; in an exemplary embodiment, a reasonably high percentage (e.g., 30-40%) of both the fixed CNTs 120 and the free CNTs 130 have a chirality which exhibits "metallic" or ballistic conductivity (e.g., a conductor or conductive chirality, such as "arm-chair" chirality (chiral vector of (n, m) where n=m or where m minus n is divisible by 3 to produce an integer quotient or is zero), such as (1,1) chirality)), with the balance exhibiting a semiconductor or other chirality, and either or both conductive and semiconductive CNTs may be utilized. In another variation described below (with reference to FIGS. 14 and 15), the fixed CNTs 120A are primarily or predominantly conductive (metallic or ballistic), and the free CNTs 130 are typically or predominantly semiconductive.

Figure 4:
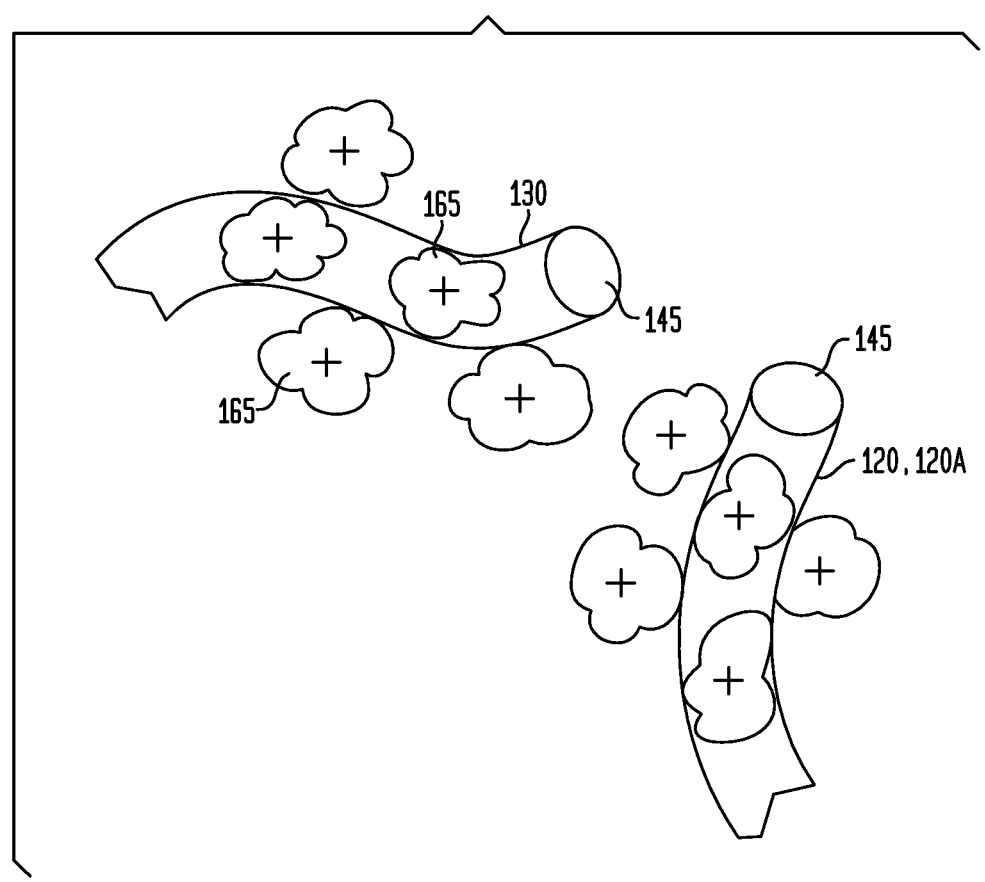
FIG. 4 is a cross-sectional view illustrating in greater detail ion adsorption and packing in the interior of a carbon nanotube and ion adsorption on the exterior of a carbon nanotube.

As discussed in greater detail below, both the fixed CNTs 120, 120A and the free CNTs 130 are uncapped or open at least one end 145, to allow ion adsorption or penetration into the interior of the fixed CNTs 120, 120A and the free CNTs 130, in addition to ion adsorption on the exterior of the fixed CNTs 120, 120A and the free CNTs 130, as illustrated in greater detail in FIG. 4 with a positively charged ion 165. The fixed CNTs 120, 120A are aligned to be substantially perpendicular or orthogonal to the plane of the substrate 105, 105A and/or the first conductor 110 (and immersed in the ionic liquid 140) (to form a reasonably densely packed "forest" of fixed CNTs 120, 120A, but with sufficient spacing to allow ion adsorption on the exterior walls of the fixed CNTs 120), while the free CNTs 130 generally are randomly dispersed and substantially or at least somewhat free to move in the ionic liquid 140. The open (uncapped) ends 145 of the fixed CNTs 120, 120A on the opposing first and second electrodes 150, 155 generally face each other to facilitate ion transport during charge and discharge cycles and perform significantly better than merely chaotically or randomly positioned nanocavities of the prior art.

In exemplary embodiments, the interior diameters of the fixed CNTs 120, 120A and the free CNTs 130 will have some variation, generally with a known or approximate statistical variance, but are generally matched or selected to be slightly larger than the ion sizes (Helmholtz diameter) of the anions and cations of the selected ionic liquid 140, allowing ions to enter into and pack the interior of the fixed CNTs 120, 120A and the free CNTs 130, similarly to the packing of a "Roman candle". In an exemplary embodiment, the interior diameter of the fixed CNTs 120, 120A and the free CNTs 130 is less than about 5 nm, or more preferably less than about 4 nm, or more preferably less than about 3 nm, or more preferably less than about 2 nm, or more preferably less than about 1 nm. In an exemplary embodiment, the interior diameter of the fixed CNTs 120 and the free CNTs 130 is between about 0.5 nm and 1.5 nm. In another exemplary embodiment, the interior diameter of the fixed CNTs 120, 120A and the free CNTs 130 is about 0.7 nm. In another exemplary embodiment, there are multiple interior diameters of the fixed CNTs 120, 120A and the free CNTs 130, generally within a predetermined variance, and may be utilized to accommodate more than one ionic liquid having different ion sizes. In an exemplary embodiment, the fixed CNTs 120, 120A and the free CNTs 130 have lengths on the order of about 20 µm, or more preferably less than about 10 µm, or more preferably less than about 5 µm, or more preferably less than about 2 µm, or more preferably between about 0.5 µm to 1.5 µm.

Figure 3:
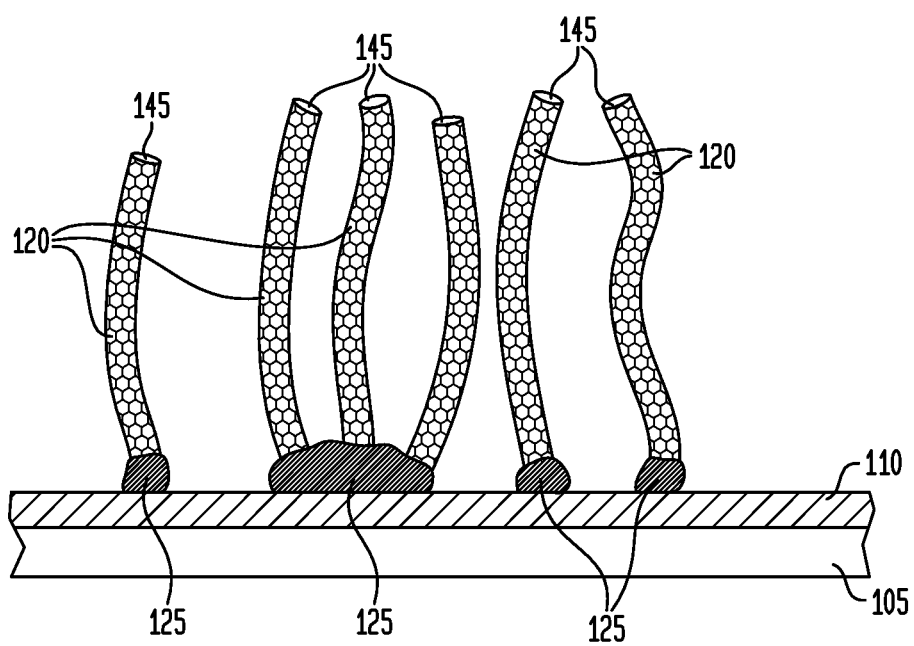
FIG. 3 is a cross-sectional view illustrating in greater detail fixed CNTs coupled through a magnetic catalyst nanoparticle to a first conductor to form an electrode.

FIG. 3 is a cross-sectional view illustrating in greater detail fixed CNTs 120 coupled through a magnetic catalyst nanoparticle 125 to a first conductor 110 to form a first electrode 150 and a second electrode 155, which may be either an anode or a cathode. In exemplary embodiments, the fixed CNTs 120, 120A (and also free CNTs 130) have been grown in a fluid-bed reactor using any of various catalysts, such as "seed" or catalyst nanoparticles of cobalt, molybdenum, or a combination of cobalt and molybdenum, with the CNTs growing epitaxially from the catalyst nanoparticles. In exemplary embodiments, and a significant departure from prior art, the CNTs used to form the fixed CNTs 120 have not been cleaved from the catalyst nanoparticles during fabrication and remain attached, specifically at one, non-open end, to the catalyst nanoparticles post-fabrication. The catalyst nanoparticles are magnetic, such as comprising cobalt or cobalt-molybdenum, forming magnetic catalyst nanoparticles 125 which are utilized to align, couple and attach the fixed CNTs 120 to the first conductor 110, as discussed in greater detail below, forming a densely packed "forest" of aligned, fixed CNTs 120. The magnetic catalyst nanoparticle 125 is specifically at one, non-open end of a fixed CNT 120 (or free CNT 130), and is not in the middle or otherwise embedded further into the interior of the CNT. In exemplary embodiments, one or a plurality of CNTs may be coupled to a magnetic catalyst nanoparticle 125, also as illustrated. The free CNTs 130 may or may not be attached to the catalyst particles used in their fabrication, and are illustrated in both forms in FIG. 2. A CNT coupled to the magnetic catalyst nanoparticle 125, which may be utilized to form either or both fixed CNTs 120 and free CNTs 130 (when the free CNTs 130 which are utilized have the magnetic catalyst nanoparticle 125), is also referred to herein as a "CNT-magnetic catalyst nanoparticle structure" 175, depending upon the context, to differentiate it during fabrication, as a CNT-magnetic catalyst nanoparticle structure 175 during deposition and alignment, prior to becoming coupled to the first conductor 110 or conductive substrate 105A and thereby becoming a fixed CNT 120. In exemplary embodiments, the fixed CNTs 120, 120A and the free CNTs 130 are open or uncapped at least at one end 145, and the free CNTs 130 and fixed CNTs 120A may be uncapped and open at one or both ends 145 (depending upon whether they are coupled to a magnetic catalyst nanoparticle 125). The CNTs utilized to form the fixed CNTs 120 having the magnetic catalyst nanoparticles 125, the fixed CNTs 120A, and the free CNTs 130 (with or without the magnetic catalyst nanoparticles 125) and being uncapped or open at least at one end 145 may be obtained, for example and without limitation, from SouthWest NanoTechnologies, Inc., at 2501 Technology Place, Norman, Okla. 73071, USA.

In another, seventh exemplary embodiment (700) described below, the fixed CNTs 120A may or may not have the magnetic catalyst nanoparticle 125, and are illustrated without the magnetic catalyst nanoparticle 125. For that embodiment, magnetic and electric fields are utilized to align and move (rotationally and translationally) the CNTs into contact with a conductive (e.g., metallic) nanomesh, as discussed in greater detail below.

Referring to FIGS. 2 and 3, the first conductor 110 is illustrated as coupled to a substrate 105. In any of various exemplary embodiments, the first conductor 110 and the substrate 105 are not separate components, and instead may be formed as a combined or integrated conductive substrate 105A (illustrated in FIG. 7). The fixed CNTs 120 are coupled to the first conductor 110 or to a conductive substrate 105A, such as through a soldered, sintered, alloyed, or conductive adhesive connection, and respectively form first electrode 150 and second electrode 155. The first electrode 150 (with free CNTs 130 in an ionic liquid 140) and the second electrode 155 (with free CNTs 130 in an ionic liquid 140) are separated from each other by a semipermeable membrane 115 having a pore size sufficiently large to allow comparatively unimpeded ion flow while preventing touching or other physical contact (and shorting) between the first electrode 150 and the second electrode 155. In various exemplary embodiments, the first electrode 150 and the second electrode 155 may be configured as parallel plates or sheets (prior to further configuration, such as folding or rolling), each having a substantially flat form factor, and may be flexible or nonflexible. In other exemplary embodiments, such as the capacitor 600 embodiment illustrated in FIG. 9, the first electrode 150 and the second electrode 155 are each fan-folded and may be flexible or nonflexible. The capacitors 100, 200, 300, 400, 500, 600, 700 also may have any of various overall, resulting shapes, sizes, and form factors, such as by further folding or rolling of the opposing electrodes (with their sandwiched contents, the ionic liquid 140 and the free CNTs 130 on each side of the semipermeable membrane 115).

It should be noted that the exemplary capacitors 100, 200, 300, 400, 500, 600, 700 are effectively comprised of two, mirror image halves, with one half having the first electrode 150 and the other half having the second electrode 155. The second electrode 155 may be fabricated identically to the first electrode 150, and then placed (upside down or face down, effectively as a mirror image) over the first electrode 150 and additional components (free CNTs 130, semipermeable membrane 115, and free CNTs 130), such as by lamination. (As a consequence, it should be noted that in various contexts, the first conductor 110 in the second electrode 155 may need to be differentiated from the first conductor 110 in the first electrode 150. Therefore, the first conductor 110 in the second electrode 155 may also be referred to herein as a "second conductor" as the context may require, in the claims for example, simply to differentiate it from the first conductor 110 in the first electrode 150; it should be understood that such a reference to a "second conductor" is referring to a first conductor 110 in the second electrode 155 to differentiate it in a context which also refers to the first conductor 110 in the first electrode 150.)

The free CNTs 130 are not coupled to other structures within the capacitor 100 (200, 300, 400, 500, 600, 700), but to some degree, some of the free CNTs 130 may form or have formed attachments to each other, also as illustrated in FIG. 2. In addition, it is possible that some of the free CNTs 130 could conceivably form some type of attachments to the fixed CNTs 120 or the semipermeable membrane 115 or the sealant 35, such as due to frictional forces, Van Der Waals forces or manufacturing process variation, for example and without limitation. Nonetheless, in exemplary embodiments, at least most or the majority of the free CNTs 130 are uncoupled to the fixed structures within a capacitor 100, 200, 300, 400, 500, 600, 700, such as uncoupled to the fixed CNTs 120, 120A, the first electrode 150, and the semipermeable membrane 115, and are effectively floating or otherwise free to move in the ionic liquid 140, such that the free CNTs 130 are generally movable in their entireties and will move translationally and/or rotationally in response to an electric field, for both charging and discharging the capacitor 100. This type of movement is to be contrasted to the potential movement of fixed CNTs 120, 120A or CNTs utilized in prior art capacitors, in which one end may be free to move and undulate to some degree, analogously to the movement of blades of grass in the wind, but are not free to rotate or translate in their entireties.

To preserve exterior surface area, the free CNTs 130 generally are dispersed within the ionic liquid 140 with minimal or comparatively slight formation of any matting or entanglement. The free CNTs 130 are utilized not only to provide additional interior and exterior surface area for ion adsorption, but also to physically impede or otherwise slow the rate of ion movement during charge and discharge through their physical translational and/or rotational movement within the ionic liquid 140, in direct opposition to prior art. The packing (and queuing) of ions with the interior of the fixed CNTs 120, 120A and the free CNTs 130 will also serve to impede or delay ion movement, with charge and discharge occurring more sequentially as ions individually enter or exit the opening of the fixed CNTs 120 and the free CNTs 130. This effect serves to extend the time period over which charge and discharge may occur and provide comparatively higher energy density (or specific energy), yielding a device which may also exhibit characteristics of a traditional battery.

As mentioned above, the exemplary capacitor 100, 200, 300, 400, 500, 600, 700 embodiments may be formed through a printing or other deposition processes, such as through screen, flexographic or Gravure printing. A first conductor 110 is deposited on the substrate 105, such as using a conductive ink. Alternatively, a conductive substrate 105A may be utilized, such as a metal foil or sheet. As discussed in greater detail below, a scaffolding or other support structure is also formed or attached, such as a nanofiber support structure 170 formed through electrospinning of a polymer and illustrated in FIGS. 5 and 13. CNT-magnetic catalyst nanoparticle structures 175 (i.e., the CNTs having the magnetic catalyst nanoparticles 125 that will form the fixed CNTs 120) are dispersed in an ionic liquid 140 and deposited over the first conductor 110 (or conductive substrate 105A) and any support structure 170, with a magnetic field applied to pull the magnetic catalyst nanoparticle 125 (with attached CNT) down to the first conductor 110 (or conductive substrate 105A) or to pull the magnetic catalyst nanoparticle 125 (with attached CNT) through the support structure 170 and down to the first conductor 110 (or conductive substrate 105A), such that the magnetic catalyst nanoparticles 125 may be electrically coupled to the first conductor 110 (or conductive substrate 105A) to thereby form the fixed CNTs 120 which are aligned about or substantially perpendicular to the first conductor 110 (or conductive substrate 105A), forming a first (or second) electrode 150 (155). Heat or electromagnetic radiation (e.g., uv light) may be applied to couple (bond or cure) the magnetic catalyst nanoparticles 125 to the first conductor 110 (or conductive substrate 105A), and with the corresponding attached CNTs, form the fixed CNTs 120. An additional electric field may also be applied to align or orient the CNT portion of the fixed CNTs 120, particularly as additional CNTs are coupled to the first conductor 110 (or conductive substrate 105A). The free CNTs 130 (also dispersed in an ionic liquid 140, and which may or may not have magnetic catalyst nanoparticles 125) are deposited over the fixed CNTs 120, forming a first half of a capacitor 100, 200, 300, 400, 500, 600, 700, followed by deposition or other attachment of the semipermeable membrane 115. Additional free CNTs 130 (also immersed in an ionic liquid 140) are deposited over the semipermeable membrane 115, followed by deposition of a second (or first) electrode 155 (or 150), formed as described above for a first (or second) electrode 150 (155), such as by folding, lamination or other placement, as described in greater detail below. Electric leads 15, 25 are attached to the first conductor 110 (or conductive substrate 105A) of each electrode 150, 155, and the device may be sealed (sealant 35), forming a capacitor 100, 200, 300, 400, 500, 600, 700.

Ionic liquids are molten-salts that at room temperature have immeasurably low vapor pressure, are non-flammable, have high ionic conductivity, have a wide range of thermal and electrochemical stabilities, and are capable of dispersing various forms of CNTs. An ionic liquid 140 may be selected based upon stability over time and temperature, a comparatively wide electrochemical window or decomposition voltage, comparatively high conductivity, capability to disperse CNTs, a lack of corrosiveness (for other components, such as the CNTs and conductors), purity (e.g., hydrophobic, with water being the most typical impurity), and aprotic characteristics (to avoid hydrogen ion discharge at the cathodes). The ionic liquid 140 utilized herein may be comprised of any one or more ionic liquids and mixtures of combinations thereof, including for example and without limitation: butyltrimethylammonium bis(trifluoromethylsulfonyl)imide, 1-ethyl-3-methylimidazolium bis(trifluoromethylsulfonyl)imide, 1-methyl-3-propylimidazolium bis(trifluoromethylsulfonyl)imide, 1-hexyl-3-methylimidazolium bis(trifluoromethylsulfonyl)imide, 1-methyl-3-propylimidazolium iodide, 1-ethyl-3-methylimidazolium thiocyanate, 1-methyl- 1-propylpiperidinium bis(trifluoromethylsulfonyl)imide, 1-butyl-2-methylpyridinium bis(trifluoromethylsulfonyl)imide, 1-butyl-4-methylpyridinium bis(trifluoromethylsulfonyl)imide, 1-butyl-1-methylpyrrolidinium bis(trifluoromethylsulfonyl)imide, diethylmethylsulfonium bis(trifluoromethylsulfonyl)imide, lithium bis(trifluoromethylsulfonyl)imide, and mixtures thereof. Other ionic liquids as utilized in the electronic and electrochemical arts may also be suitable, and are considered equivalent and within the scope of the disclosure.

The magnetic catalyst nanoparticles 125 may be comprised of any of various magnetic materials, including without limitation cobalt, molybdenum, nickel, iron, ruthenium, combinations and alloys thereof such as or cobalt-molybdenum, and their compounds.

The semipermeable membrane 115 may be comprised of any suitable material, including without limitation a polytetrafluoroethylene (PTFE or Teflon) membrane, such as a 23 µm thick PTFE membrane having a pore size of about 0.05 µm and a porosity of 50-70%, available from WL Gore & Associates. Another suitable semipermeable membrane 115 may be Celgard™ thin film available from Celgard LLP, also for example and without limitation. The types and compositions of other components of the exemplary capacitor 100, 200, 300, 400, 500, 600, 700 embodiments, such as substrates 105, 105A and first conductors 110 are described in greater detail below.

The substrate (or base) 105 may be comprised of any suitable material, such as plastic, paper, cardboard, or coated paper or cardboard, for example and without limitation. The substrate 105 may comprise any flexible or nonflexible material having the strength and degree of electrical insulation to withstand the intended use conditions. In an exemplary embodiment, a substrate 105 comprises a polyester or plastic sheet, such as a CT-7 seven mil polyester sheet treated for print receptiveness commercially available from MacDermid Autotype, Inc. of MacDermid, Inc. of Denver, Colo., USA, for example. In another exemplary embodiment, a substrate 105 comprises a polyimide film such as Kapton commercially available from DuPont, Inc. of Wilmington Del., USA, also for example. Also in an exemplary embodiment, substrate 105 comprises a material having a dielectric constant capable of or suitable for providing sufficient electrical insulation for the excitation and discharge voltages which may be selected. A substrate 105 may comprise, also for example, any one or more of the following: paper, coated paper, plastic coated paper, fiber paper, cardboard, poster paper, poster board, books, magazines, newspapers, wooden boards, plywood, and other paper or wood-based products in any selected form; plastic or polymer materials in any selected form (sheets, film, boards, and so on); natural and synthetic rubber materials and products in any selected form; natural and synthetic fabrics in any selected form; glass, ceramic, and other silicon or silica-derived materials and products, in any selected form; building materials and products; or any other product, currently existing or created in the future. In a first exemplary embodiment, a substrate 105 may be selected which provides a degree of electrical insulation (i.e., has a dielectric constant or insulating properties sufficient to provide electrical insulation of the one or more first conductors 110 deposited or applied on a first (front) side of the substrate 105), either electrical insulation from each other or from other apparatus or system components. For example, while comparatively expensive choices, a glass sheet or a silicon wafer also could be utilized as a substrate 105. In other exemplary embodiments, however, a plastic sheet or a plastic-coated paper product is utilized to form the substrate 105 such as the polyester mentioned above or patent stock and 100 lb. cover stock available from Sappi, Ltd., or similar coated papers from other paper manufacturers such as Mitsubishi Paper Mills, Mead, and other paper products. In another exemplary embodiment, an embossed plastic sheet or a plastic-coated paper product having a plurality of grooves, also available from Sappi, Ltd. is utilized, with the grooves utilized for forming the conductors 110. Suitable substrates 105 also potentially include extruded polyolefinic films, including LDPE films; polymeric nonwovens, including carded, meltblown and spunbond nowovens, and cellulosic paper. The substrate 105 may also comprise laminates of any of the foregoing materials. Two or more laminae may be adhesively joined, thermally bonded, or autogenously bonded together to form the laminate comprising the substrate. If desired, the laminae may be embossed.

The exemplary substrate 105, 105A as illustrated in the various Figures have a form factor which is substantially flat in an overall sense, such as comprising a sheet of a selected material (e.g., paper or plastic) which may be fed through a printing press, for example and without limitation, and which may have a topology on a first surface (or side) which includes surface roughness, cavities, channels or grooves or having a first surface which is substantially smooth within a predetermined tolerance (and does not include cavities, channels or grooves). Those having skill in the art will recognize that innumerable, additional shapes and surface topologies are available, are considered equivalent and within the scope of the disclosure.

The first conductor 110 may be comprised of any suitable material, applied or deposited (on a first side or surface of the substrate 105), such as through a printing process, to a thickness depending upon the type of conductive ink or polymer, such as to about 0.1 to 6 microns (e.g., about 3 microns for a typical silver ink, gold ink, aluminum ink, and to less than one micron for a nanosilver ink). In an exemplary method of manufacturing the exemplary capacitor 100, 200, 300, 400, 500, 600, 700 embodiments, a conductive ink, polymer, or other conductive liquid or gel (such as a silver (Ag) ink or polymer, a nano silver ink composition, a carbon nanotube ink or polymer, or silver/carbon mixture such as amorphous nanocarbon (having particle sizes between about 75-100 nm) dispersed in a silver ink) is deposited on a substrate 105, 105A, such as through a printing or other deposition process, and may be subsequently cured or partially cured (such as through an ultraviolet (uv) curing process), to form the one or more first conductors 110. In another exemplary embodiment, the one or more first conductors 110 may be formed by sputtering, spin casting (or spin coating), vapor deposition, or electroplating of a conductive compound or element, such as a metal (e.g., aluminum, copper, silver, gold, nickel, palladium). Combinations of different types of conductors and/or conductive compounds or materials (e.g., ink, polymer, elemental metal, etc.) may also be utilized to generate one or more composite first conductors 110. Multiple layers and/or types of metal or other conductive materials may be combined to form the one or more first conductors 110. In various exemplary embodiments, a plurality of first conductors 110 are deposited, and in other embodiments, a first conductor 110 may be deposited as a single conductive sheet or otherwise attached (e.g., a sheet of aluminum coupled to a substrate 105) (not separately illustrated).

In an exemplary embodiment, depending upon the applied thickness, the first conductor 110 also may be etched to create nano-sized cavities or pores, on the order of 5-10 nm, which may also be filled with a solder, to facilitate attachment of the magnetic catalyst nanoparticles 125. In another exemplary embodiment, depending upon the applied thickness, the first conductor 110 also may be sanded to smooth the surface and also may be calendarized to compress the conductive particles, such as silver.

Other conductive inks or materials may also be utilized to form the one or more first conductors 110, such as copper, tin, aluminum, gold, noble metals, carbon, carbon black, single or double or multi-walled CNTs, graphene, graphene platelets, nanographene platelets, nanocarbon and nanocarbon and silver compositions, nano silver compositions (including nanosilver fiber and nanosilver particle inks), or other organic or inorganic conductive polymers, inks, gels or other liquid or semi-solid materials. In an exemplary embodiment, carbon black (having a particle diameter of about 100 nm) is added to a silver ink to have a resulting carbon concentration in the range of about 0.025% to 0.1%. In addition, any other printable or coatable conductive substances may be utilized equivalently to form the first conductor(s) 110, and exemplary conductive compounds include: (1) from Conductive Compounds (Londonberry, N.H., USA), AG-500, AG-800 and AG-510 Silver conductive inks, which may also include an additional coating UV-1006S ultraviolet curable dielectric (such as part of a first dielectric layer 125); (2) from DuPont, 7102 Carbon Conductor (if overprinting 5000 Ag), 7105 Carbon Conductor, 5000 Silver Conductor, 7144 Carbon Conductor (with UV Encapsulants), 7152 Carbon Conductor (with 7165 Encapsulant), and 9145 Silver Conductor; (3) from SunPoly, Inc., 128A Silver conductive ink, 129A Silver and Carbon Conductive Ink, 140A Conductive Ink, and 150A Silver Conductive Ink; (4) from Dow Corning, Inc., PI-2000 Series Highly Conductive Silver Ink; (5) from Henkel/Emerson & Cumings, Electrodag 725A; and (6) Monarch M120 available from Cabot Corporation of Boston, Mass., USA, for use as a carbon black additive, such as to a silver ink to form a mixture of carbon and silver ink. In addition, conductive inks and compounds may be available from a wide variety of other sources.

A conductive substrate 105A may be any type of prefabricated substrate 105 discussed above which has been coated or otherwise has deposited a conductor or conductive layer (e.g., a first conductor as described above). A conductive substrate 105A may be any type of conductor, mixture of conductors, alloys of conductors, etc., including those discussed above, which has or have a form factor suitable for deposition of the CNTs such as, for example and without limitation, a conductive foil or sheet, such as an aluminum foil, a nickel foil, a carbon foil, a CNT foil, a graphene foil, a silver foil, a gold foil, an iron sheet, a steel sheet, other types of sheet metal, etc.

Conductive polymers which are substantially optically transmissive may also be utilized to form the one or more first conductors 110. For example, polyethylene-dioxithiophene may be utilized, such as the polyethylene-dioxithiophene commercially available under the trade name "Orgacon" from AGFA Corp. of Ridgefield Park, N.J., USA, in addition to any of the other transmissive conductors discussed below and their equivalents. Other conductive polymers, without limitation, which may be utilized equivalently include polyaniline and polypyrrole polymers, for example. In another exemplary embodiment, carbon nanotubes which have been suspended or dispersed in a polymerizable ionic liquid or other fluids are utilized to form various conductors which are substantially optically transmissive or transparent.

Organic semiconductors, variously called $\pi$-conjugated polymers, conducting polymers, or synthetic metals, are inherently semiconductive due to $\pi$-conjugation between carbon atoms along the polymer backbone. Their structure contains a one-dimensional organic backbone which enables electrical conduction following n– or p+ type doping. Well-studied classes of organic conductive polymers include poly (acetylene)s, poly(pyrrole)s, poly(thiophene)s, polyanilines, polythiophenes, poly(p-phenylene sulfide), poly(para-phenylene vinylene)s (PPV) and PPV derivatives, poly(3-alkylthiophenes), polyindole, polypyrene, polycarbazole, polyazulene, polyazepine, poly(fluorene)s, and polynaphthalene. Other examples include polyaniline, polyaniline derivatives, polythiophene, polythiophene derivatives, polypyrrole, polypyrrole derivatives, polythianaphthene, polythianaphthane derivatives, polyparaphenylene, polyparaphenylene derivatives, polyacetylene, polyacetylene derivatives, polydiacethylene, polydiacetylene derivatives, polyparaphenylenevinylene, polyparaphenylenevinylene derivatives, polynaphthalene, and polynaphthalene derivatives, polyisothianaphthene (PITN), polyheteroarylenvinylene (ParV), in which the heteroarylene group can be, e.g., thiophene, furan or pyrrol, polyphenylene-sulphide (PPS), polyperinaphthalene (PPN), polyphthalocyanine (PPhc) etc., and their derivatives, copolymers thereof and mixtures thereof. As used herein, the term derivatives means the polymer is made from monomers substituted with side chains or groups.

The method for polymerizing the conductive polymers is not particularly limited, and the usable methods include uv or other electromagnetic polymerization, heat polymerization, electrolytic oxidation polymerization, chemical oxidation polymerization, and catalytic polymerization, for example and without limitation. The polymer obtained by the polymerizing method is often neutral and not conductive until doped. Therefore, the polymer is subjected to p-doping or n-doping to be transformed into a conductive polymer. The semiconductor polymer may be doped chemically, or electrochemically. The substance used for the doping is not particularly limited; generally, a substance capable of accepting an electron pair, such as a Lewis acid, is used. Examples include hydrochloric acid, sulfuric acid, organic sulfonic acid derivatives such as parasulfonic acid, polystyrenesulfonic acid, alkylbenzenesulfonic acid, camphorsulfonic acid, alkylsulfonic acid, sulfosalycilic acid, etc., ferric chloride, copper chloride, and iron sulfate.

Those having skill in the electronic or printing arts will recognize innumerable variations in the ways in which the one or more first conductors 110 may be formed, with all such variations considered equivalent and within the scope of the disclosure. For example, the one or more first conductors 110 may also be deposited through sputtering or vapor deposition, without limitation. In addition, for other various embodiments, the one or more first conductors 110 may be deposited as a single or continuous layer, such as through coating, printing, sputtering, or vapor deposition. Those having skill in the electronic or printing arts also will recognize innumerable variations in the ways in which the CNTs 120, 130 dispersed in an ionic liquid may be deposited, such as through printing, with all such variations considered equivalent and within the scope of the disclosure.

As a consequence, as used herein, "deposition" includes any and all printing, coating, rolling, spraying, layering, sputtering, plating, spin casting (or spin coating), vapor deposition, lamination, affixing and/or other deposition processes, whether impact or non-impact, known in the art. "Printing" includes any and all printing, coating, rolling, spraying, layering, spin coating, lamination and/or affixing processes, whether impact or non-impact, known in the art, and specifically includes, for example and without limitation, screen printing, inkjet printing, electro-optical printing, electroink printing, photoresist and other resist printing, thermal printing, laser jet printing, magnetic printing, pad printing, flexographic printing, hybrid offset lithography, Gravure and other intaglio printing, for example. All such processes are considered deposition processes herein and may be utilized. The exemplary deposition or printing processes do not require significant manufacturing controls or restrictions. No specific temperatures or pressures are required. Some clean room or filtered air may be useful, but potentially at a level consistent with the standards of known printing or other deposition processes. For consistency, however, such as for proper alignment (registration) of the various successively deposited layers forming the various embodiments, relatively constant temperature (with possible exceptions, discussed below, such as for applied heat for bonding magnetic catalyst nanoparticles 125 to a first conductor 110 or conductive substrate 105A) and humidity may be desirable. In addition, the various compounds utilized may be contained within various polymers, binders or other dispersion agents which may be heat-cured or dried, air dried under ambient conditions, or IR or uv cured.

It should also be noted, generally for any of the applications of various compounds herein, such as through printing or other deposition, the surface properties or surface energies may also be controlled, such as through the use of resist coatings or by otherwise modifying the "wetability" of such a surface, for example, by modifying the hydrophilic, hydrophobic, or electrical (positive or negative charge) characteristics, for example, of surfaces such as the surface of the substrate 105, 105A, the surfaces of the various first conductors 110, and/or other surfaces formed during fabrication. In conjunction with the characteristics of the compound, suspension, polymer or ink being deposited, such as the surface tension, the deposited compounds may be made to adhere to desired or selected locations, and effectively repelled from other areas or regions.

Figure 5:
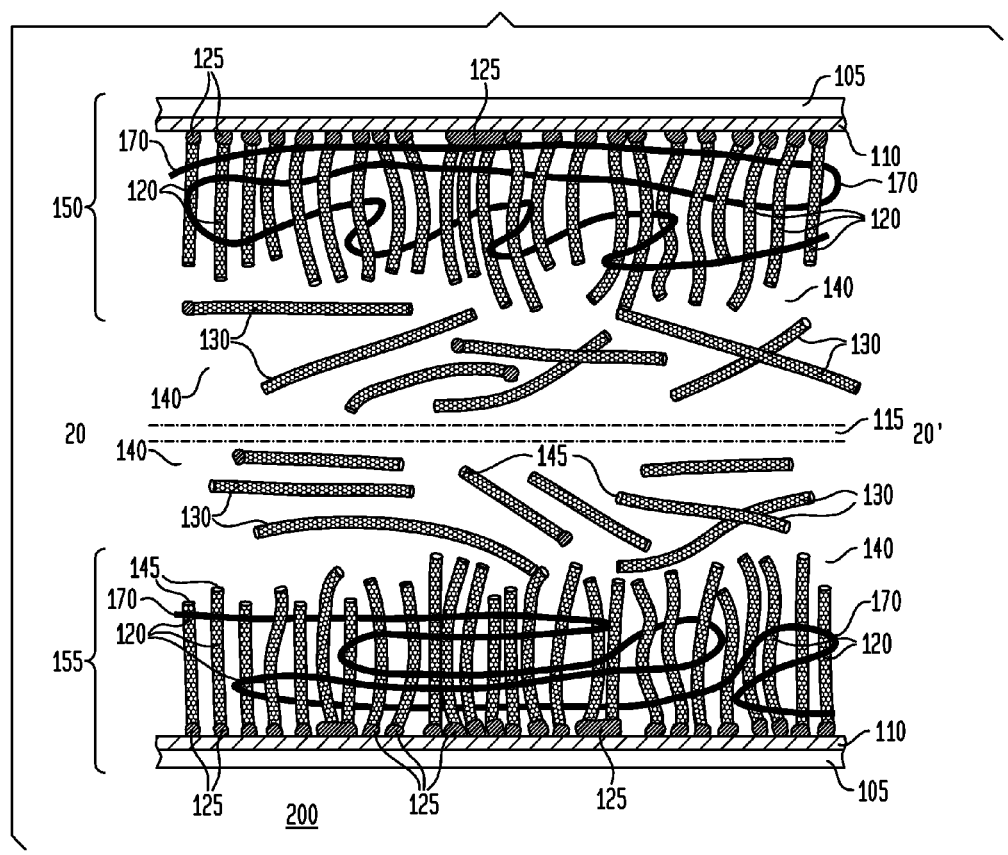
FIG. 5 is a cross-sectional view illustrating an exemplary second capacitor embodiment.
Figure 13:
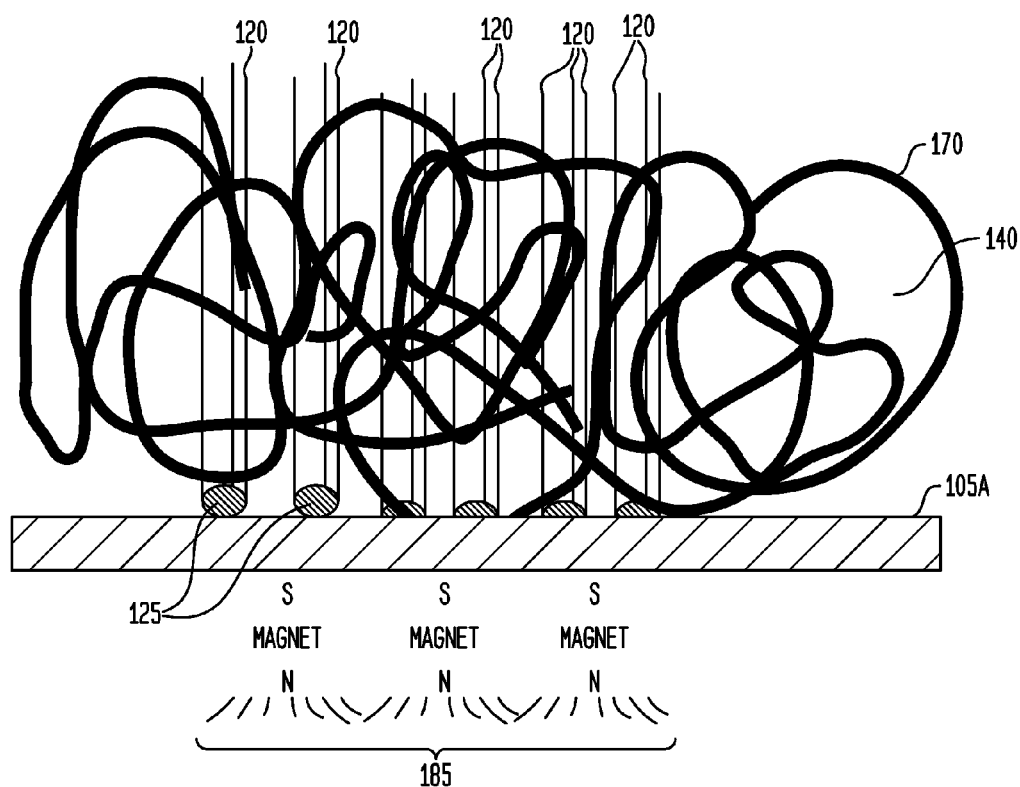
FIG. 13 is a diagram illustrating in cross section a plurality of fixed CNTs within a nanofiber support structure.

FIG. 5 is a cross-sectional view (through the 20-20' plane of FIG. 1) illustrating an exemplary second capacitor 200 embodiment. The exemplary second capacitor 200 embodiment further includes a support structure 170 mentioned above, and is otherwise substantially similar or identical to the exemplary first capacitor 100 embodiment. For this embodiment, the support structure 170 is a nanofiber support structure 170 formed through an electrospinning process, as discussed in greater detail below, and is generally formed separately from a substrate 105, 105A. An exemplary nanofiber support structure 170 is also illustrated in FIG. 13. The support structure 170 provides a secondary (or second) support for the fixed CNTs 120 at a second location separate, distinct and spaced apart from a first or primary location of support for the fixed CNTs 120 provided by the first conductor 110 (or conductive substrate 105A) at the point or area of attachment of the magnetic catalyst nanoparticle 125. The support structure 170 generally will provide this additional support to some or many (but generally not all) of the fixed CNTs 120, serving to maintain alignment of the fixed CNTs 120 generally or mostly perpendicular to the first conductor 110 (or conductive substrate 105A), thereby preventing excessive curvature and/or excessive entanglement of the fixed CNTs 120, allowing a higher density of fixed CNTs 120 on the first conductor 110 (or conductive substrate 105A) and increasing available surface area for ion adsorption. The fixed CNTs 120 which are in contact with the support structure 170 generally will serve to provide support for adjacent fixed CNTs 120 which are not in direct contact with the support structure 170, which in turn may also support other adjacent, fixed CNTs 120, and so on. As mentioned above, an exemplary support structure 170 may be formed by electrospinning of a polymer, typically prior to deposition of the CNTs which will form the fixed CNTs 120 in an ionic liquid 140. As part of the electrospinning process, the nanofiber support structure 170 is fabricated to have pores, voids or opening sizes sufficient to allow passage and pulling of the CNT-magnetic catalyst nanoparticle structures for coupling of the magnetic catalyst nanoparticle 125 to the first conductor 110 (or conductive substrate 105A) to form the fixed CNTs 120.

Figure 6:
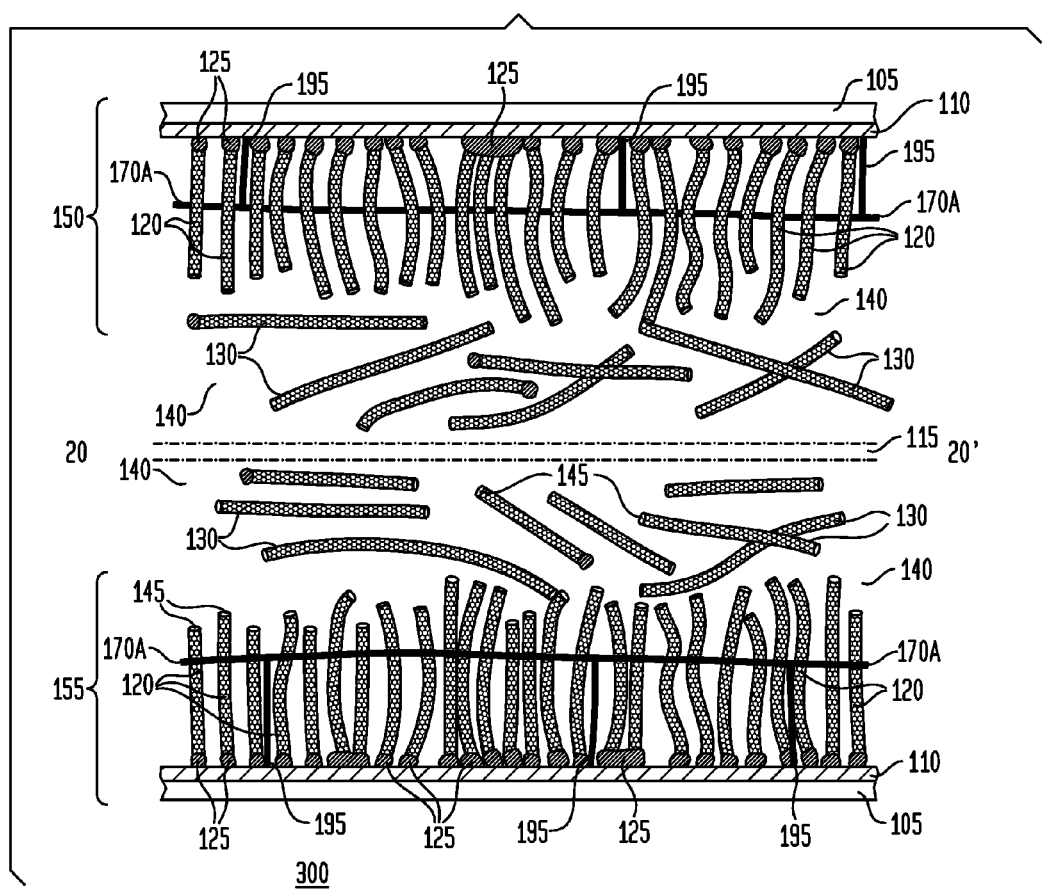
FIG. 6 is a cross-sectional view illustrating an exemplary third capacitor embodiment.

FIG. 6 is a cross-sectional view (through the 20-20' plane of FIG. 1) illustrating an exemplary third capacitor 300 embodiment. The exemplary third capacitor 300 embodiment also includes a support structure 170A, and is otherwise also substantially similar or identical to the exemplary first capacitor 100 embodiment. The support structure 170A is provided as a screen or mesh configuration, spaced apart from the first conductor 110 (or conductive substrate 105A) (such as by using posts (or spacers) 195 integrated with or formed as part of the substrate 105, 105A or the support structure 170A), and also provides a support for the fixed CNTs 120 at a second location separate, distinct and spaced apart from a first or primary location of support for the fixed CNTs 120 provided by the first conductor 110 (or conductive substrate 105A) at the point or area of attachment of the magnetic catalyst nanoparticle 125. The support structure 170A generally also will provide this additional support to some or many (but generally not all) of the fixed CNTs 120, serving to maintain alignment of the fixed CNTs 120 generally perpendicular to the first conductor 110 (or conductive substrate 105A), thereby also preventing excessive curvature and/or excessive entanglement of the fixed CNTs 120, also allowing a higher density of fixed CNTs 120 and increasing available surface area for ion adsorption. The fixed CNTs 120 which are in contact with the support structure 170 generally will also serve to provide support for adjacent fixed CNTs 120 which are not in direct contact with the support structure 170, which in turn may also support other adjacent, fixed CNTs 120, and so on. As mentioned above, an exemplary support structure 170A may be prefabricated as a screen or mesh structure and attached over and spaced apart from the first conductor 110 (or conductive substrate 105A), with the support structure 170A having a pore or opening size sufficient to allow passage and pulling of the CNT-magnetic catalyst nanoparticle structures for coupling of the magnetic catalyst nanoparticle 125 to the first conductor 110 (or conductive substrate 105A) to form the fixed CNTs 120. The openings or pores in the screen or mesh support structure 170A are visible in FIG. 6 in the upper half of the cross section of exemplary capacitor 300. In an exemplary embodiment, the support structure 170A comprises a polymer screen; in another exemplary embodiment, the support structure 170A comprises a comparatively sparse mesh of CNTs (separate from the fixed CNTs 120 and the free CNTs 130).

Figure 7:
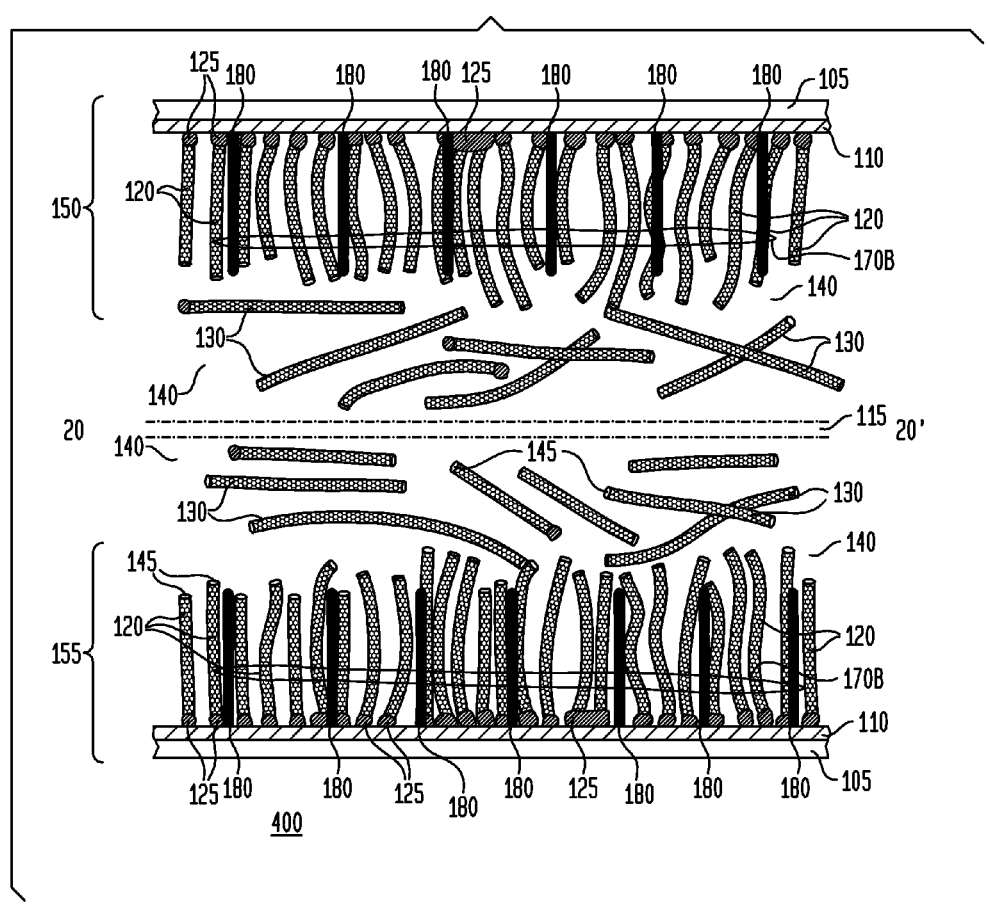
FIG. 7 is a cross-sectional view illustrating an exemplary fourth capacitor embodiment.

FIG. 7 is a cross-sectional view (through the 20-20' plane of FIG. 1) illustrating an exemplary fourth capacitor 400 embodiment. The exemplary fourth capacitor 400 embodiment also includes an integrated support structure 170B and illustrates a conductive substrate 105A, and is otherwise also substantially similar or identical to the exemplary first capacitor 100 embodiment. The support structure 170B is provided as a series of elongated pillars or columns 180, extending from the conductive substrate 105A (or first conductor 110), and also provides a support for the fixed CNTs 120 at a second location separate, distinct and spaced apart from a first or primary location of support for the fixed CNTs 120 provided by the conductive substrate 105A (or first conductor 110) at the point or area of attachment of the magnetic catalyst nanoparticle 125. The support structure 170B generally also will provide this additional support to some or many (but generally not all) of the fixed CNTs 120, serving to maintain alignment of the fixed CNTs 120 generally perpendicular to the plane of the conductive substrate 105A (or first conductor 110), thereby also preventing excessive curvature and/or excessive entanglement of the fixed CNTs 120, also allowing a higher density of fixed CNTs 120 and increasing available surface area for ion adsorption. The fixed CNTs 120 which are in contact with the support structure 170B generally will also serve to provide support for adjacent fixed CNTs 120 which are not in direct contact with the support structure 170B, which in turn may also support other adjacent, fixed CNTs 120, and so on. In this exemplary embodiment, the support structure 170B may be formed integrally with the substrate 105 or conductive substrate 105A, e.g., as a textured or embossed surface, with the support structure 170B having voids or openings between the pillars or columns 180 with a size sufficient to allow passage and pulling of the CNT-magnetic catalyst nanoparticle structures for coupling of the magnetic catalyst nanoparticle 125 to the conductive substrate 105A (or first conductor 110) to form the fixed CNTs 120.

Figure 8:
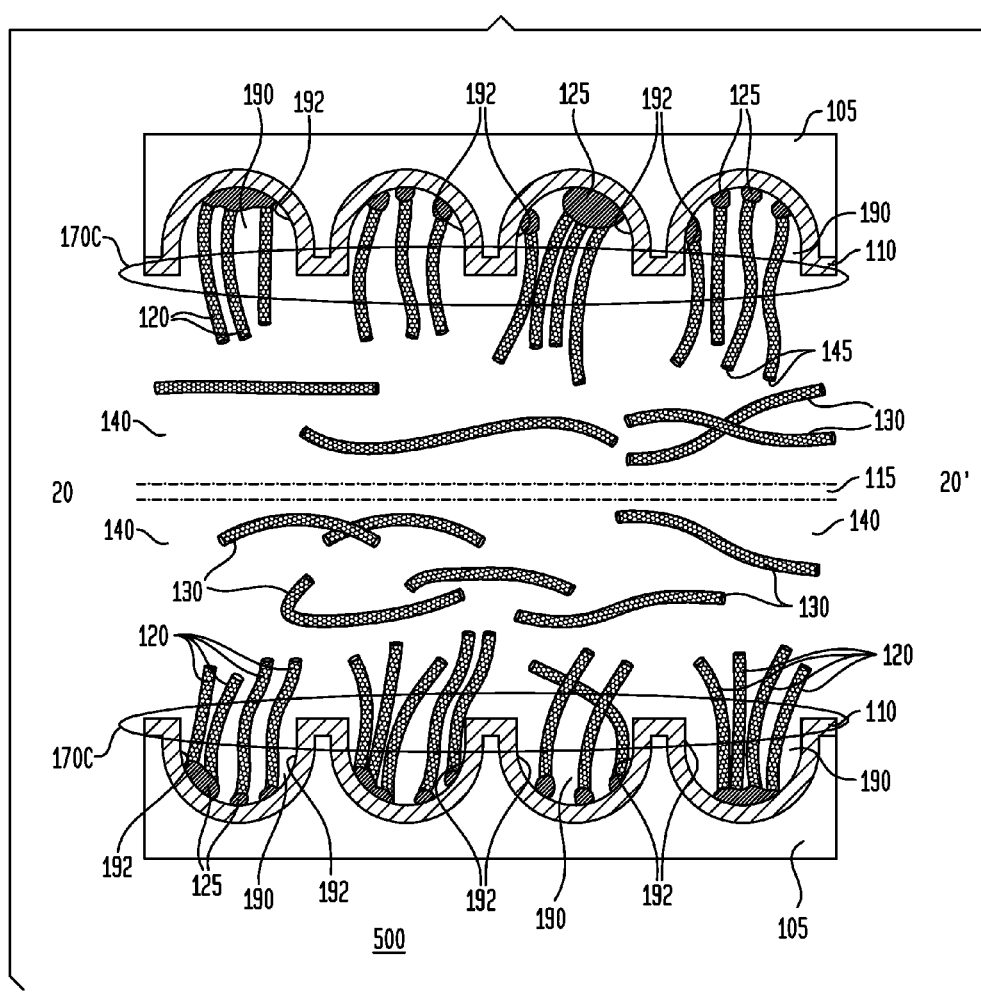
FIG. 8 is a cross-sectional view illustrating an exemplary fifth capacitor embodiment.

FIG. 8 is a cross-sectional view (through the 20-20' plane of FIG. 1) illustrating an exemplary fifth capacitor 500 embodiment. The exemplary fifth capacitor 500 embodiment also includes a plurality of cavities, wells, grooves, channels or cavities 190, the walls or sides 192 of which form an integrated support structure 170C, and is otherwise also substantially similar or identical to the exemplary first capacitor 100 embodiment. The support structure 170C is provided as a series of walls or sides of the cavities 190, extending from the first conductor 110 (or conductive substrate 105A), and also provides a support for the fixed CNTs 120 at a second location separate, distinct and spaced apart from a first or primary location of support for the fixed CNTs 120 provided by the first conductor 110 (or conductive substrate 105A) at the point or area of attachment of the magnetic catalyst nanoparticle 125. The support structure 170C generally also will provide this additional support to some or many (but generally not all) of the fixed CNTs 120, serving to maintain alignment of the fixed CNTs 120 generally perpendicular to the first conductor 110 (or conductive substrate 105A), thereby also preventing excessive curvature and/or excessive entanglement of the fixed CNTs 120, also allowing a higher density of fixed CNTs 120 and increasing available surface area for ion adsorption. The fixed CNTs 120 which are in contact with the support structure 170C generally will also serve to provide support for adjacent fixed CNTs 120 which are not in direct contact with the support structure 170C, which in turn may also support other adjacent, fixed CNTs 120, and so on. In this exemplary embodiment, the support structure 170C may be formed integrally with the substrate 105 or conductive substrate 105A, e.g., as a textured or embossed surface, or may be formed as part of the first conductor 110, with the cavities 190 having a size sufficient to allow passage and pulling of the CNT-magnetic catalyst nanoparticle structures for coupling of the magnetic catalyst nanoparticle 125 to the first conductor 110 (or conductive substrate 105A) to form the fixed CNTs 120.

For example, the substrate 105 may include a plurality of cavities (or voids) 190, which for the selected embodiment, may be formed as elongated cavities, effectively forming channels, grooves or slots (or, equivalently, depressions, valleys, bores, openings, gaps, orifices, hollows, slits, or passages), or may be shaped to be substantially circular or elliptical depressions or bores, for example and without limitation. Accordingly, any reference herein to cavities 190 shall be understood to mean and include the other, or any other cavity of any shape or size. The plurality of cavities 190 are spaced-apart, and may also be utilized to define a "holding well" for the fixed CNTs 120. While the cavities or channels 190 are illustrated in FIG. 9 as substantially parallel and oriented in the same direction, those having skill in the art will recognize that innumerable variations are available, including depth and width of the channels, channel orientation (e.g., circular, elliptical, curvilinear, wavy, sinusoidal, triangular, fanciful, artistic, etc.), spacing variations, type of void or cavity (e.g., channel, depression or bore), etc., and all such variations are considered equivalent and within the scope of the present invention.

Figure 9:
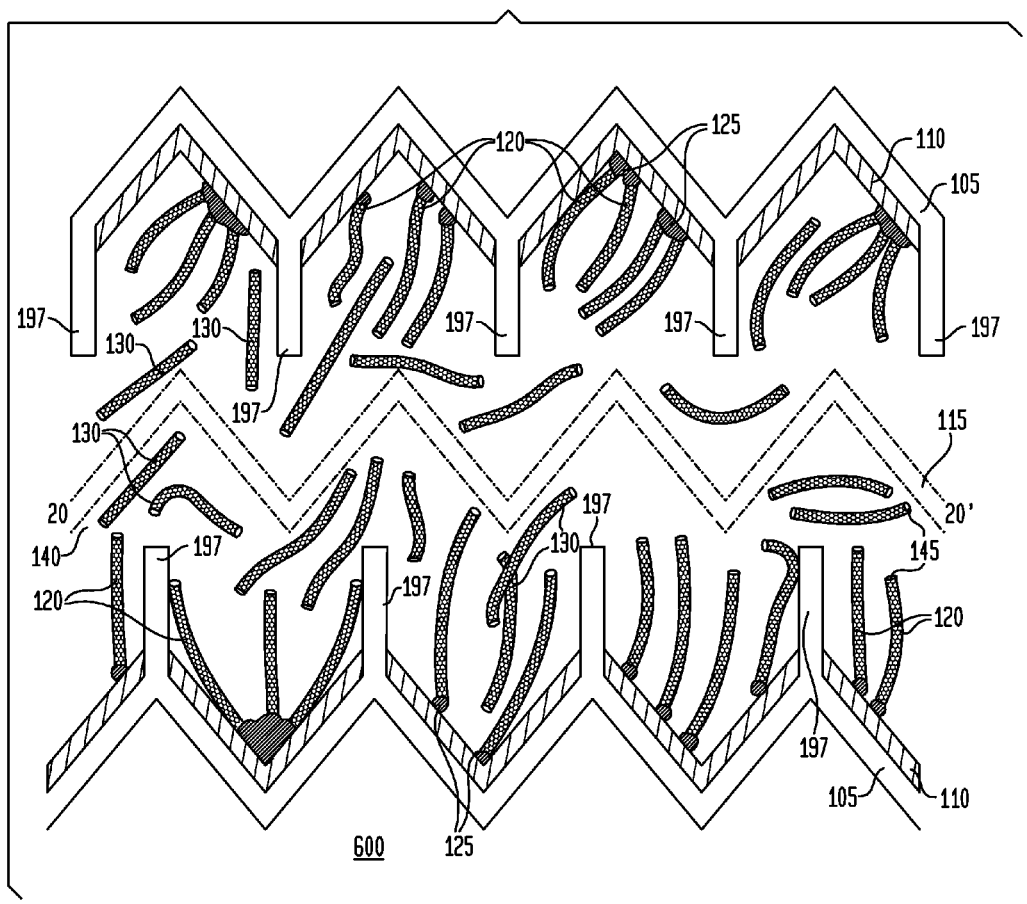
FIG. 9 is a cross-sectional view illustrating an exemplary sixth capacitor embodiment.

FIG. 9 is a cross-sectional view (through the 20-20' plane of FIG. 1) illustrating an exemplary sixth capacitor 600 embodiment. The exemplary sixth capacitor 600 embodiment is initially fabricated as a substantially flat structure and then provided with a "fan fold". The folding may occur during fabrication of the first electrode 150 and the second electrode 155, or may occur after the capacitor 600 is assembled but prior to sealing. For example, the substrate 105, 105A may be provided with scoring or other demarcation to facilitate such folding. The exemplary sixth capacitor 600 embodiment includes posts (or spacers) 197 to offset the first and second electrodes 150, 155 from each other, and has the fixed CNTs 120 in any of a plurality of orientations or alignments, not merely generally perpendicular, and is otherwise also substantially similar to the exemplary first capacitor 100 embodiment, including the use of the free CNTs 130. In this exemplary embodiment, the fixed CNTs 120 are coupled to the first conductor 110 or conductive substrate 105A through the magnetic catalyst nanoparticle 125, but otherwise may have or assume any orientation, as illustrated. Also in this exemplary embodiment, the fixed CNTs 120 may or may not be aligned and pulled magnetically to the first conductor 110 or conductive substrate 105A, but may simply be deposited over and coupled to the first conductor 110 or conductive substrate 105A.

As mentioned above, it is believed that the exemplary capacitor 100, 200, 300, 400, 500, 600, 700 embodiments do not have a simple exponential drop in voltage over time of the classical capacitor (e.g., $e^{-t/\tau}$, where $\tau$ is an RC time constant). Instead, the voltage drop is delayed due to the separate contributions of the different charge storing components (e.g., a superposition of the contributions of the different components) and the movement of the free CNTs 130 in the ionic liquid. For example, discharge may occur due to the ion movement away from the exterior of the fixed CNTs 120 and the free CNTs 130 ($\tau_1$), with additional discharge from ion movement out of the interior of the fixed CNTs 120 and/or the free CNTs 130 ($\tau_2$), and with additional delayed ion movement due to the movement of the free CNTs 130 ($\tau_3$), each of which may occur at different rates, resulting in a superposition of these separate contributions, resulting in a higher energy density (or specific energy), yielding a device also exhibits characteristics of a traditional battery while still having the comparatively higher specific power (or power density) and longer cycle life of a traditional capacitor.

Figure 10A:
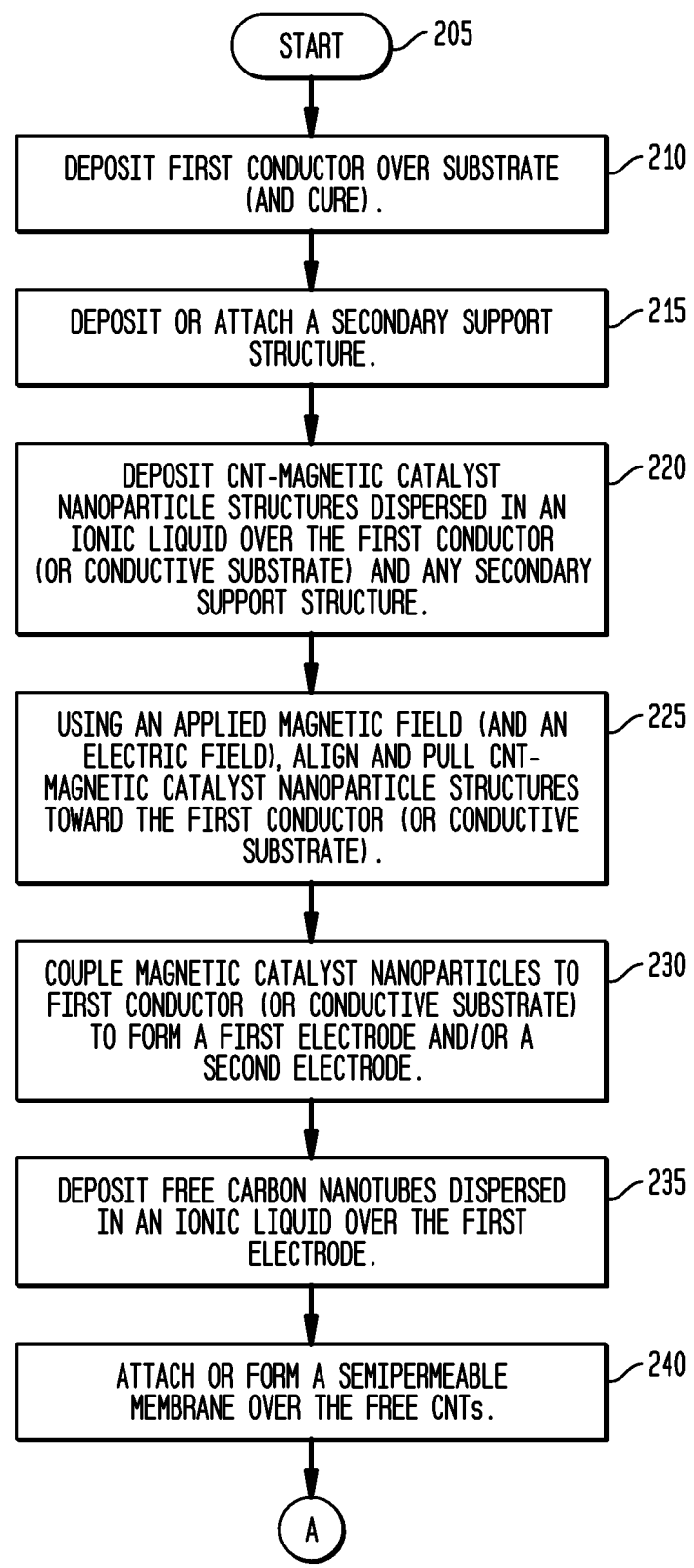
Figure 11:
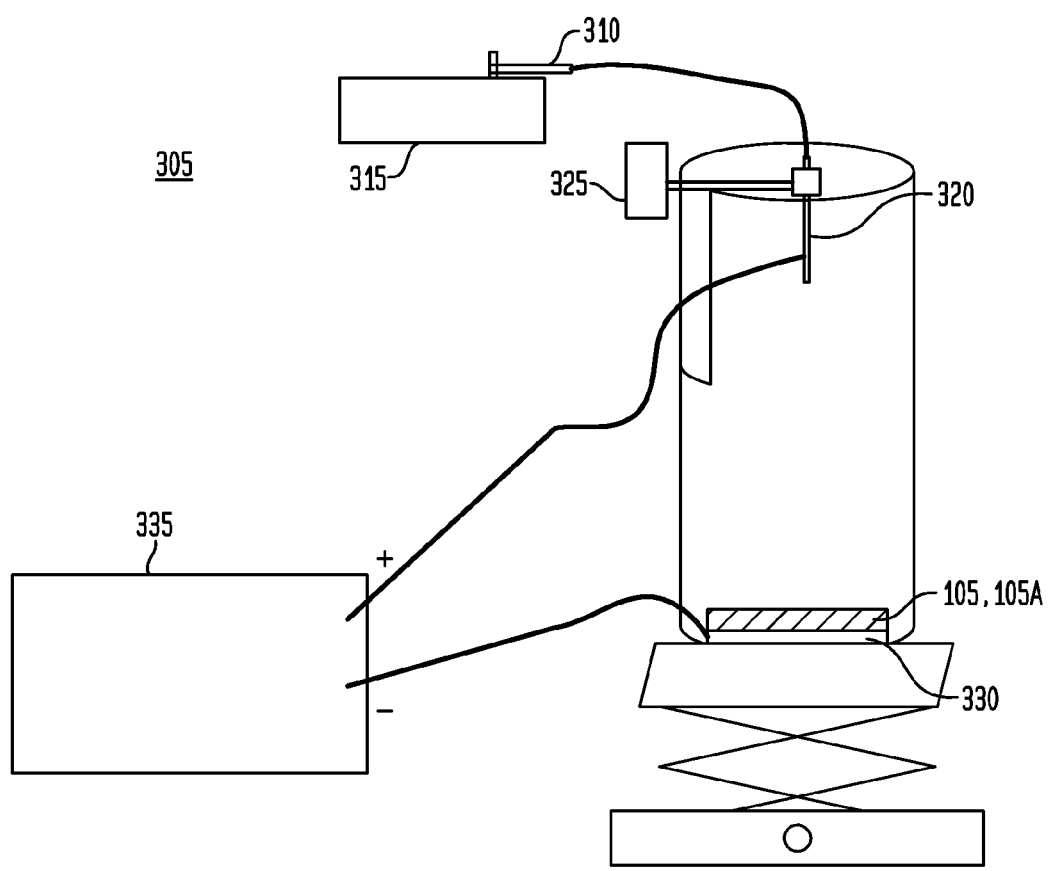
FIG. 11 is a block diagram illustrating an exemplary system for nanofiber electrospinning for formation of a secondary support structure.
Figure 12:
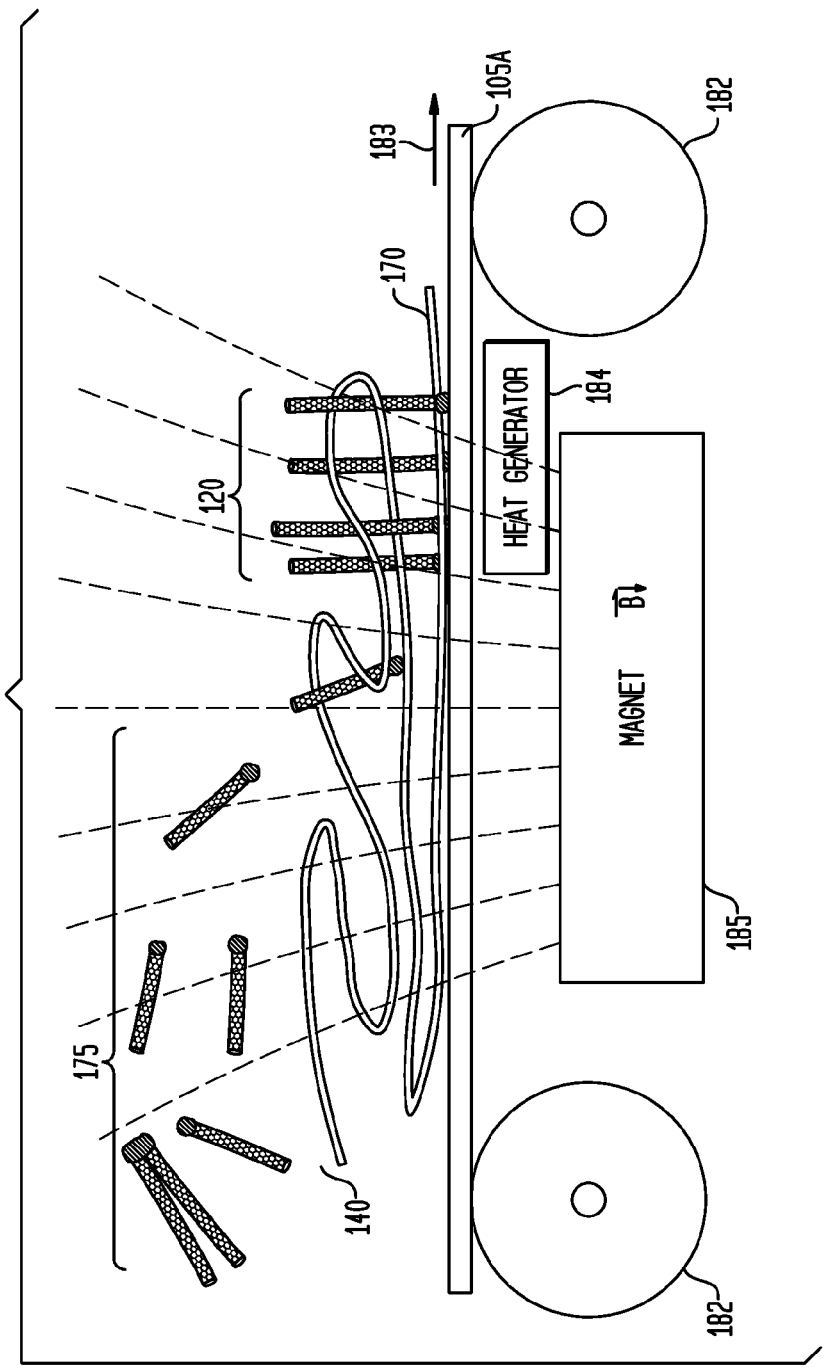
FIG. 12 is a diagram illustrating in cross section the use of a magnetic field to orient the CNT-magnetic catalyst nanoparticle structures and couple the magnetic catalyst nanoparticles to the first conductor (or conductive substrate) to form fixed CNTs.

FIG. 10 (divided into FIGS. 10A and 10B) is a flow chart illustrating a first method of fabricating the exemplary multilayer carbon nanotube-based capacitor, such as the exemplary capacitor 100, 200, 300, 400, 500, 600 embodiments. FIG. 11 is a block diagram illustrating an exemplary system for nanofiber electrospinning for formation of a nanofiber secondary support structure 170. FIG. 12 is a diagram illustrating in cross section the use of a magnetic field to orient the CNT-magnetic catalyst nanoparticle structures 175 and couple the magnetic catalyst nanoparticles 125 to the first conductor 110 (or conductive substrate 105A) to form fixed CNTs 120. FIG. 13 is a diagram illustrating in cross section a plurality of fixed CNTs 120 within a nanofiber support structure 170. As mentioned above, the exemplary capacitor 100, 200, 300, 400, 500, 600, 700 embodiments may be formed through a printing or other deposition processes, such as through screen, flexographic or Gravure printing.

Referring to FIG. 10, beginning with start step 205, a first conductor 110 is deposited on the substrate 105, such as by printing a conductive ink or a conductive ink followed by a conductive adhesive, step 210. Alternatively, step 210 may be omitted when a conductive substrate 105A is utilized, such as a metal foil. A secondary support structure 170 is also deposited or attached, step 215, such as through electrospinning of a polymer over the first conductor 110 (or conductive substrate 105A) or attachment or lamination of a screen-type secondary support structure 170A. The CNT-magnetic catalyst nanoparticle structures 175 which have been dispersed in an ionic liquid 140 (and which will form the fixed CNTs 120) are deposited over the first conductor 110 (or conductive substrate 105A) and any secondary support structure 170, step 220. As illustrated in FIG. 12, a magnetic field is applied, step 225, to pull the magnetic catalyst nanoparticle 125 (with attached CNT) toward or down to the first conductor 110 (or conductive substrate 105A) or to pull the magnetic catalyst nanoparticle 125 (with attached CNT) through the support structure 170 and toward or down to the first conductor 110 (or conductive substrate 105A) (as illustrated in FIG. 13), such that the magnetic catalyst nanoparticles 125 may be electrically coupled to the first conductor 110 (or conductive substrate 105A), step 230, with the fixed CNTs 120 also aligned about or substantially perpendicular to the first conductor 110 (or conductive substrate 105A) in selected embodiments, forming a first (or second) electrode 150 (155). In step 230, heat or electromagnetic radiation (e.g., uv light) may be applied to couple (bond or cure) the magnetic catalyst nanoparticles 125 to the first conductor 110 (or conductive substrate 105A), to thereby form the fixed CNTs 120. Such bonding may include soldering, sintering, alloying, or forming a conductive adhesive bond. An additional electric field may also be applied in step 230 to align or orient the CNT portion of the fixed CNTs 120, particularly as additional CNTs are coupled to the first conductor 110 (or conductive substrate 105A). A first plurality of the free CNTs 130 (also dispersed in an ionic liquid 140) are deposited over the fixed CNTs 120, step 235, followed by deposition or other attachment of the semipermeable membrane 115, step 240. An additional, second plurality of free CNTs 130 (also dispersed in an ionic liquid 140) are deposited over the semipermeable membrane 115, step 245, followed by deposition of a second (or first) electrode 155 (or 150), formed as described above for a first (or second) electrode 150 (155), such as by folding, lamination, or other placement step 250. It should be noted that step 245 may be omitted when the second electrode is formed using the same substrate and is folded over to form the capacitor, in which case the free CNTs 130 have been deposited in step 235, the semipermeable membrane 115 coupled over the first electrode in step 240, with the second electrode (with free CNTs 130 from step 235) folded over on top of the first electrode. Electric leads 15, 25 are attached to the first conductor 110 (or conductive substrate 105A) of each electrode 150, 155, step 255, and the device is sealed (sealant 35), step 260, forming a capacitor 100, 200, 300, 400, 500, 600, and the method may end, step 265. Not separately illustrated, there may be additional curing steps prior to deposition of additional layers, such as curing of an electrospun nanofiber secondary support structure 170 prior to deposition of the CNT-magnetic catalyst nanoparticle structures.

For example, first conductors 110 may be formed as two separate areas on a substrate 105, step 210, with steps 215 through 230 performed for each separate area, forming first and second electrodes 150, 155. Step 245 (deposition of the free CNTs 130), step 250 (attachment of a semipermeable membrane 115), and step 255 (deposition of the free CNTs 130 over the semipermeable membrane 115) are performed for a first electrode 150. The second electrode 155, having been fabricated one the second area of the same substrate 105, may then be attached or coupled by folding the substrate 105, 105A, placing the second electrode 155 over the free CNTs 130, semipermeable membrane 115, free CNTs 130, and first electrode 150.

Referring to FIG. 11, an exemplary system 305 for nanofiber electrospinning for formation of a secondary support structure 170 comprises a syringe 310 coupled to a syringe pump 315, with a polymer held in the syringe 310 and ejected through a needle 320 (which functions as an electrode and is subjected to a voltage, such as a positive voltage), with the needle 320 held by a needle holder (having a fine movement controller) 325. The polymer which will form the nanofiber is ejected through the needle 320 toward the negative (or grounded negative) electrode 330 which, in conjunction with the movement of the needle 320 and variations in the electric field location, allows the ejected polymer to be shaped (as it is spun onto the substrate 105, 105A held above the electrode 330) to create the nanofiber support structure 170, such as the nanofiber support structure 170 illustrated in FIG. 13. Fiber density and thickness may also be controlled by varying the distance between the electrodes, polymer concentration, time and rate of the polymer supply, etc. Also as illustrated, power supply 335 provides the corresponding voltages to the needle 320 and negative electrode 330. Any other system and method of electrospinning which is known or becomes known in the art may also be utilized equivalently and is considered within the scope of the disclosure.

The nanofiber support structure 170 may be comprised of a conductive polymer and further contribute to increasing the capacitance of the capacitor 200, 300, 400 embodiments. There are three basic groups of conductive polymers (conjugated polymers) which are considered useful for conductive-polymer-based supercapacitors, including without limitation: (1) polypyrolle; (2) polianiline; and (3) derivatives of polythiophene and polyterthiophene, such as: poly(3,4-ethylene-dioxythiophene) (PEDOT), poly(3-(4-fluorophenyl) thiophene) (MPFT), poly(3-(3,4-difluorophenyl)thiophene) (MPFT), poly(3-(4-trifluoromethylphenyl)-thiophene) (PT-FMPT), poly(1-cyano-2-(2-(3,4-ethylenedioxylthienyl))-1-(2-thienyl)vinylene (ThCNVEDT), poly(3-methyl thiophene)(PMeT); and mixtures thereof. Additives such as other polymers and CNTs (single or multiwall) may be included in the polymer mixture to improve properties of the nanofibers such as mechanical strength, surface area, average thickness of fibers, and conductivity.

The nanofiber support structure 170 also may be comprised of a nonconductive polymer, which may have greater solubilities and require less aggressive or corrosive solvents. Such nonconductive polymers may also be doped or mixed with carbon nanotubes, amorphous carbon or metals to become conductive to some extent and also contribute to the overall capacitance of the devices. Water-soluble polymers (e.g., polyethylene oxide, polyvinyl alcohol) may be advantageous as enabling use of non-toxic solvents.

An exemplary nanofiber support structure 170 is on the order of about 0.5 μm to 1.5 μm in height. In an exemplary embodiment, the diameter of a fiber of the nanofiber support structure 170 is on the order of about 20-30 nm, although smaller diameters may also be utilized and are within the scope of the disclosure. Also in an exemplary embodiment, the spaces between fibers of the nanofiber support structure 170 is on the order of about 5-7 nm, although smaller or larger spaces may also be utilized and are within the scope of the disclosure. The nanofiber support structure 170 may also be etched to create additional surface area for ion adsorption.

FIG. 12 is a diagram illustrating in cross section the use of a magnetic field to orient the CNT-magnetic catalyst nanoparticle structures 175 and couple the magnetic catalyst nanoparticles 125 to the first conductor 110 (or conductive substrate 105A) to form fixed CNTs 120. As illustrated, a substrate 105A (or a substrate 105 with a first conductor 110) having a support structure 170, in this case a nanofiber support structure 170, is moving laterally (direction 183) over support rollers 182 and a magnet 185 (which may be a permanent magnet or an electromagnet), as CNT-magnetic catalyst nanoparticle structures 175 dispersed in an ionic liquid 140 are deposited over the nanofiber support structure 170, such as part of a printing or other deposition process. Not separately illustrated, the conductive substrate 105A or the first conductor 110 may further have or comprise layer of solder or other bonding agent, such as a solder comprising nickel beads coated with bismuth, for example and without limitation. As the CNT-magnetic catalyst nanoparticle structures 175 enter the magnetic field, they are rotated and translated within the ionic liquid 140, being pulled and aligned (or oriented) by the force on the magnetic catalyst nanoparticles 125 from the magnetic field and toward the substrate 105A or first conductor 110, analogously to the movement of a shuttlecock though the air. As the magnetic catalyst nanoparticles 125 contact or are within a predetermined distance from the conductive substrate 105A (or first conductor 110), heat (or other infrared or electromagnetic radiation) is applied, such as through a heat generator 184, to bond the magnetic catalyst nanoparticles 125 to the conductive substrate 105A or first conductor 110 to form fixed CNTs 120, such as by melting any applied solder or sintering the magnetic catalyst nanoparticles 125 with the conductive substrate 105A or first conductor 110, for example and without limitation. In addition, not separately illustrated, an electric field may also be applied to create and additional force to align (orient) and maintain the CNT portion of the CNT-magnetic seed nanoparticle structure 175 generally perpendicular to the plane of the conductive substrate 105A or first conductor 110 (with substrate 105).

For the sake of completeness, it should be noted that the conductive substrate 105A or first conductor 110 may be magnetic or nonmagnetic, and generally will be nonmagnetic in many embodiments (e.g., comprised of aluminum, or silver, or carbon), as discussed in greater detail below.

Exemplary aligned, fixed CNTs 120, having magnetic catalyst nanoparticles 125 bonded to the substrate 105A and/or first conductor 110, and with the CNT portion of the CNT-magnetic seed nanoparticle structure 175 generally perpendicular to the plane of the conductive substrate 105A or first conductor 110 (with substrate 105) and supported by a nanofiber support structure 170, is illustrated in FIG. 13. It should be noted, however, that while the CNT portions of the fixed CNTs 120 are illustrated as substantially straight and perpendicular for ease of illustration, those having skill in the art will recognize that the fixed CNTs 120, 120A will generally have some degree of curvature, bending, spiraling, and potential undulation within the ionic liquid 140.

Figure 14:
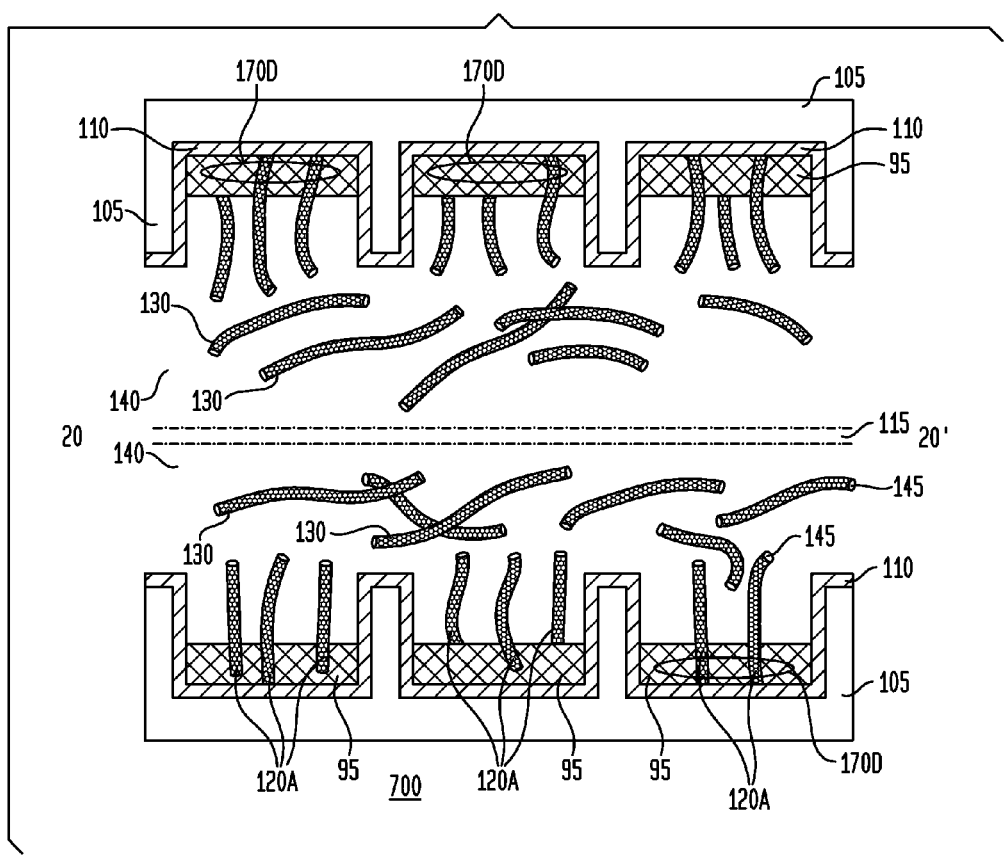
FIG. 14 is a cross-sectional view illustrating an exemplary seventh capacitor embodiment.

FIG. 14 is a cross-sectional view (through the 20-20' plane of FIG. 1) illustrating an exemplary seventh capacitor 700 embodiment. The exemplary seventh capacitor 700 embodiment also includes a support structure 170D comprised of a conductive (or metallic) nanomesh 95, and utilizes fixed CNTs 120A, which may or may not include magnetic catalyst nanoparticles 125 (and are illustrated without magnetic catalyst nanoparticles 125), utilizes a plurality of cavities (as previously discussed), and is otherwise also substantially similar or identical to the exemplary first capacitor 100 embodiment. In addition, the exemplary seventh capacitor 700 embodiment may also be fabricated slightly differently, as illustrated and discussed below with reference to FIG. 15. The support structure 170D is provided as a mesh configuration. Conductive (or metallic) nanorods (or, equivalently, nano rods), such as gold or palladium nanorods, having a diameter less than about 100 nm and having a wide range of lengths (e.g., 200 nm to 1.5 µm, or more preferably 200 nm to 1.0 µm, or more preferably 300 nm to 1.0 µm, for example and without limitation) are deposited above or on top of the first conductor 110 (or conductive substrate 105A), and form a mesh 95, into which the (conductive or ballistic) CNTs will become entangled and coupled (e.g., by sintering), to form the fixed CNTs 120A. In addition to providing support, the nanomesh 95 also makes one or more electrical connections to the CNTs and to the first conductor 110, so that the fixed CNTs 120A are electrically coupled to the first conductor 110 through the nanomesh 95, in addition to any direct electrical couplings between the fixed CNTs 120A and the first conductor 110. The support structure 170D (nanomesh 95) also provides a support for the fixed CNTs 120A at one or more second locations separate, distinct and spaced apart from a first or primary location of support for the fixed CNTs 120A provided by the first conductor 110 (or conductive substrate 105A) or another (first) location on the support structure 170D. The support structure 170D generally also will provide this additional support or electrical coupling to some or many (but generally not all) of the deposited CNTs, with those CNTs which are coupled thereby forming the fixed CNTs 120A, serving to maintain alignment of the fixed CNTs 120A generally perpendicular to the first conductor 110 (or conductive substrate 105A), and thereby also preventing excessive curvature and/or excessive entanglement of the fixed CNTs 120A, also allowing a higher density of fixed CNTs 120A and increasing available surface area for ion adsorption. An exemplary support structure 170D, formed as a metallic or conductive nanomesh 95, will typically have a pore or opening size sufficient to allow passage and pulling of the (conductive or ballistic) CNTs for coupling of the (conductive or ballistic) CNTs to the first conductor 110 (or conductive substrate 105A) or to the nanomesh 95 to form the fixed CNTs 120A.

Figure 15A:
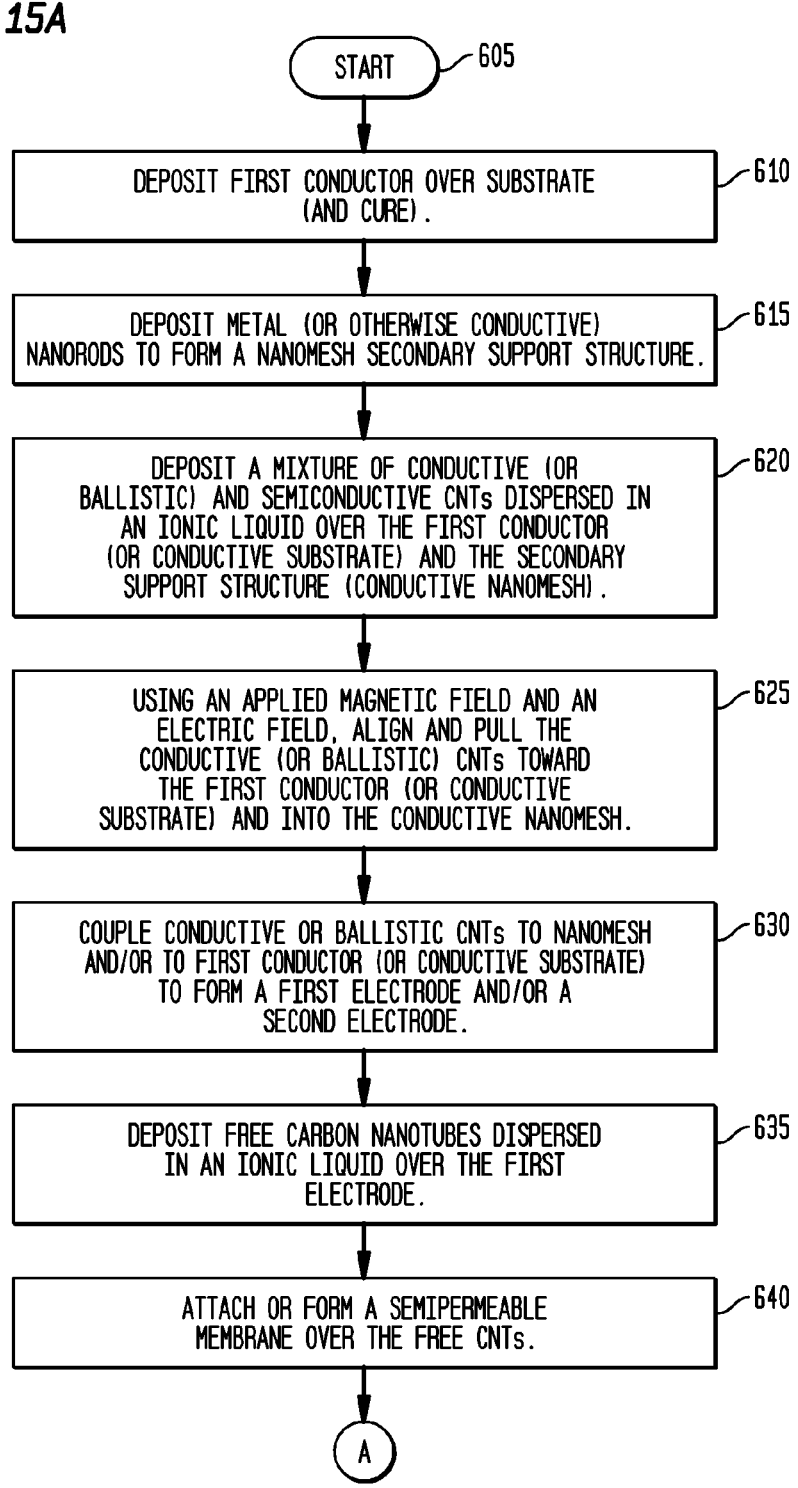
FIGS. 15A and 15B, is a flow chart illustrating a second method of fabricating an exemplary multilayer carbon nanotube-based capacitor.
Figure 15B:
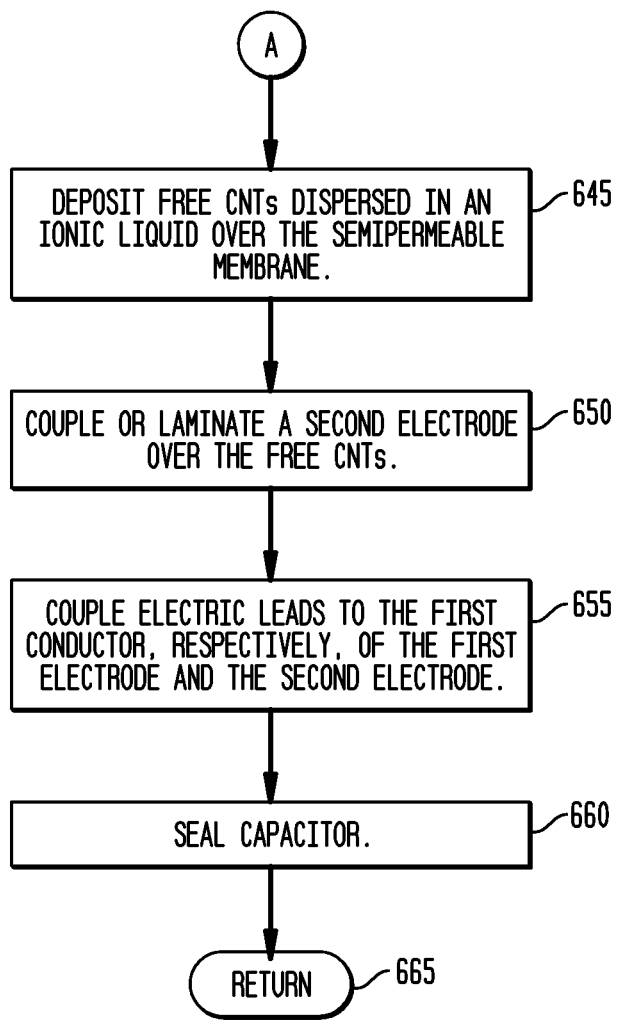

FIG. 15, divided into FIGS. 15A and 15B, is a flow chart illustrating a second method of fabricating an exemplary multilayer carbon nanotube-based capacitor, such as exemplary seventh capacitor 700 embodiment. Referring to FIG. 15, beginning with start step 605, a first conductor 110 is deposited on the substrate 105, such as by printing a conductive ink or a conductive ink followed by a conductive adhesive, step 610. Alternatively, step 610 may be omitted when a conductive substrate 105A is utilized, such as a metal foil. Conductive (or metallic) nanorods, having a diameter less than about 100 nm and having a wide range of lengths (e.g., 200 nm to 1.5 µm, or more preferably 200 nm to 1.0 µm, or more preferably 300 nm to 1.0 µm, for example and without limitation) are deposited above or on top of the first conductor 110 (or conductive substrate 105A), and form a nanomesh 95, step 615. A mixture of a plurality of conductive or ballistic CNTs and semiconductive CNTs (with or more likely without magnetic catalyst nanoparticles 125) which have been dispersed in an ionic liquid 140 (and some of which will form the fixed CNTs 120A) are deposited over the nanomesh 95 and first conductor 110 (or conductive substrate 105A), step 620. Alternatively, as a variation of step 620, a plurality of conductive or ballistic CNTs (without semiconductive CNTs, and also generally without magnetic catalyst nanoparticles 125) which have been dispersed in an ionic liquid 140 (and some of which will form the fixed CNTs 120A) may be deposited over the nanomesh 95 and first conductor 110 (or conductive substrate 105A).

Similarly to the illustration of FIG. 12, an electric field and a magnetic field are applied, step 625, using the electric field to align the conductive or ballistic CNTs and using the magnetic field to pull the conductive or ballistic CNTs toward and down into the nanomesh 95, and to some extent through the nanomesh 95 and toward or down to the first conductor 110 (or conductive substrate 105A) (similar to the illustration in FIG. 13). It should be noted that the conductive or ballistic CNTs will respond much more strongly to the electric and magnetic fields compared to the semiconductive CNTs. In this way, the conductive or ballistic CNTs differentially may be electrically coupled to the nanomesh 95 and/or first conductor 110 (or conductive substrate 105A) to form fixed CNTs 120A, step 630, with the fixed CNTs 120A also aligned about or substantially perpendicular to the first conductor 110 (or conductive substrate 105A) in selected embodiments, forming a first (or second) electrode 150 (155). In step 630, heat (e.g., sintering at 130 degrees C.) or electromagnetic radiation (e.g., uv light) may be applied to couple (bond or cure) the conductive or ballistic CNTs to the nanomesh 95 and/or first conductor 110 (or conductive substrate 105A), to thereby form the fixed CNTs 120A, and also to bond the nanomesh 95 to the first conductor 110. More generally, such bonding also could include soldering, sintering, alloying, or forming a conductive adhesive bond. As the semiconductive CNTs are much less likely to respond (align and move) to the applied fields, generally most (or all) of the semiconductive CNTs will remain dispersed and free in the ionic liquid, thereby forming free CNTs 130. In the event additional free CNTs 130 are necessary or desirable, a plurality of the free CNTs 130 (also dispersed in an ionic liquid 140) may be deposited over the fixed CNTs 120A, step 635, followed by deposition or other attachment of the semipermeable membrane 115, step 640. An additional, second plurality of free CNTs 130 (also dispersed in an ionic liquid 140) may be deposited over the semipermeable membrane 115 (depending on whether the capacitor 700 will be formed by folding the substrate 105, 105A as discussed above), step 645, followed by deposition of a second (or first) electrode 155 (or 150), formed as described above for a first (or second) electrode 150 (155), such as by folding, lamination, or other placement step 650. Electric leads 15, 25 are attached to the first conductor 110 (or conductive substrate 105A) of each electrode 150, 155, step 655, and the device is sealed (sealant 35), step 660, forming a capacitor 700, and the method may end, step 665. Not separately illustrated, there may be additional curing or sintering steps prior to deposition of additional layers, such as curing or sintering of the nanomesh 95 prior to deposition of the conductive or ballistic CNTs (and semiconductive CNTs).

In addition, while conductive or ballistic CNTs and semiconductive CNTs are typically produced together within a batch, there are additional ways to enrich or concentrate the percentage of conductive or ballistic CNTs and/or preferentially separate out the conductive or ballistic CNTs, such as by using surfactants which differentially adsorb on CNTs with different chiralities. For example, metallic (conductive or ballistic) CNTs may be better dispersed with ionic surfactants, while semiconductive CNTs may be better dispersed with non-ionic surfactants such as polymers or DNA. The mixture of CNTs deposited over the nanomesh 95 will then have a higher percentage of conductive or ballistic CNTs, which will tend to increase the capacitance of the capacitor 700.

A first way to enrich the mixture of CNTs with metallic (conductive or ballistic) CNTs is to disperse CNTs with polymers such as poly(N-decyl-2,7-carbazole) [2] and poly[9,9-dioctylfluorenyl-2,7-diyl], such as with sonication, and use a centrifuge for separating dispersed and non-dispersed CNTs. The precipitate will be enriched with metallic CNTs. This action can be repeated several times. Then the precipitation will be dispersed with a surfactant suitable for an application. A second way is to consider two phase immiscible system (like water/oil). When an ionic surfactant is dissolved in one phase and non-ionic surfactant is dissolved in another phase, metallic and non-metallic CNTs will have tendency to accumulate in different phases, with this process being repeated several times to generate the metallic CNTs enriched phase.

It should also be noted that the fixed CNTs 120, 120A will generally be placed and secured with irregular, and to some degree random, spacing over the substrate 105A or first conductor 110. Such varied and irregular spacing between the fixed CNTs 120, 120A is illustrated in FIGS. 2, 5-7, and 14 for example. Various fabrication techniques, however, as they become more refined empirically, will tend to limit such spacing irregularity to within a predetermined variance. This is in sharp contrast to the alignment of CNTs in the prior art, which generally have a much more regular and predetermined spacing between and among the CNTs as they are fabricated directly on the electrodes or transferred directly from a silicon growth wafer.

In addition, while illustrated as coupled generally entirely across a first conductor 110 or conductive substrate 105A, it should also be noted that the fixed CNTs 120, 120A may be coupled in any desired pattern, within such predetermined variance. For example, the fixed CNTs 120, 120A may be patterned into spaced apart hexagonal areas, with "streets" of conductor between them, for example and without limitation. Such patterning may be effective in adjusting the overall resistance of an exemplary capacitor 100, 200, 300, 400, 500, 600, 700.

Figure 16:
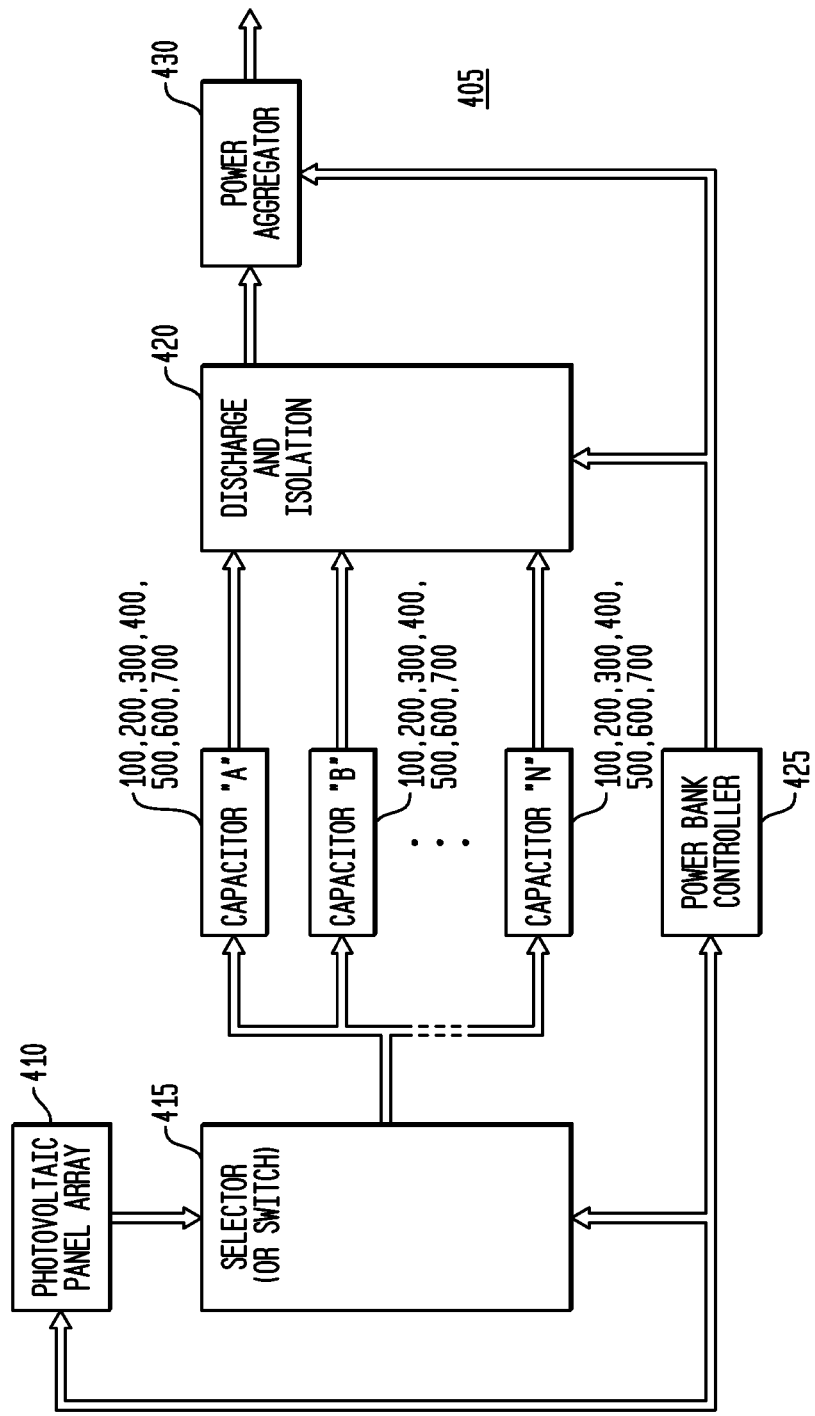
FIG. 16 is a block diagram illustrating an exemplary first supercapacitor system embodiment.

FIG. 16 is a block diagram illustrating an exemplary first supercapacitor system 405 embodiment. As illustrated, exemplary capacitors 100, 200, 300, 400, 500, 600, 700 may be utilized as one or more banks or arrays of capacitors to store energy from one or more photovoltaic panels 410, with any given capacitor 100, 200, 300, 400, 500, 600, 700 selected using selector or switch 415 (which may also provide fault isolation, for example). Discharge and iolation control (420) may be provided, with power or energy from the capacitors 100, 200, 300, 400, 500, 600, 700 provided to a power aggregator (430) for providing current or voltage output, and under the control of a power bank controller 425, as illustrated. Not separately illustrated, various sensors (illustrated in FIG. 17) are typically provided for use in providing feedback of various voltage and current levels to the power bank controller 425. The controller 425 (and controller 525, below) typically implement or control interfaces such as a user interface, a data interface, isolation control, dynamic demand control, instrumentation and sensing, various safety matters, etc.

Figure 17:
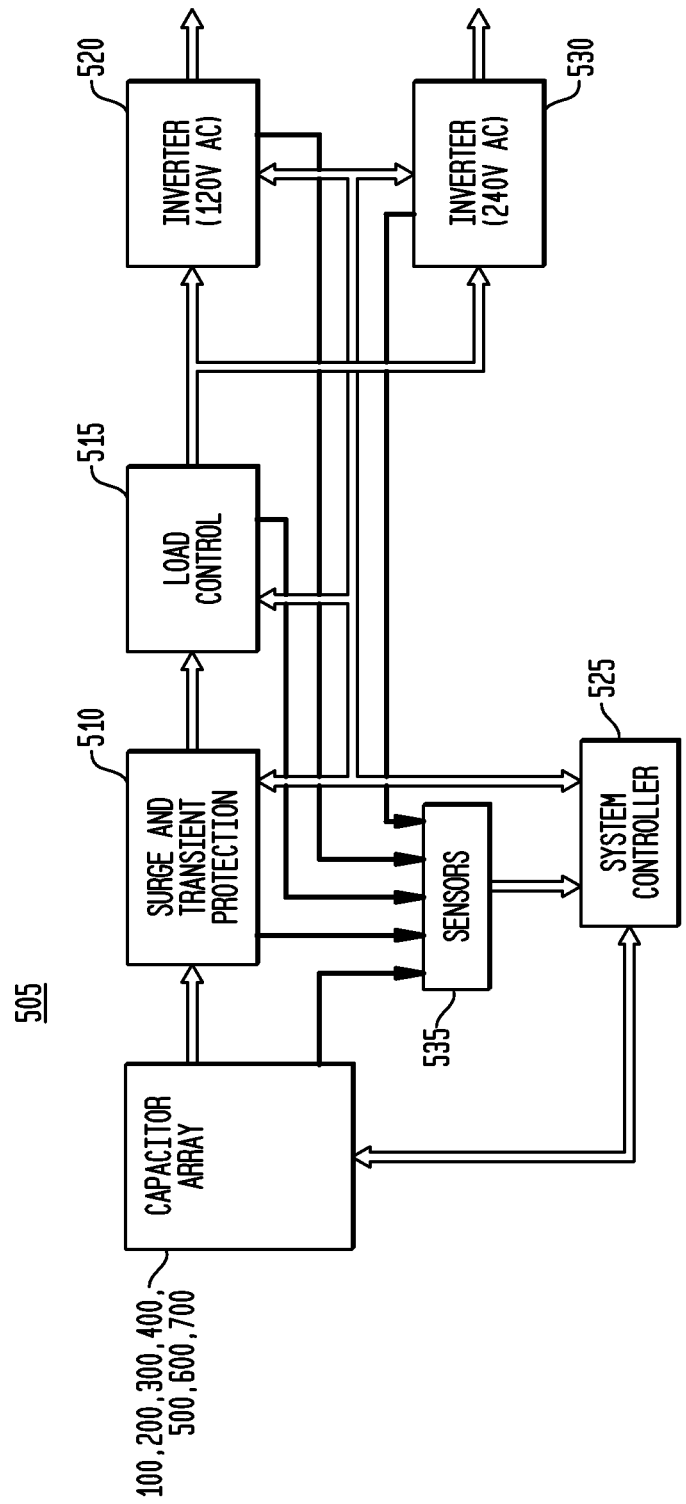
FIG. 17 is a block diagram illustrating an exemplary second supercapacitor system embodiment.

FIG. 17 is a block diagram illustrating an exemplary second supercapacitor system 505 embodiment. As illustrated, exemplary capacitors 100, 200, 300, 400, 500, 600, 700 may be utilized as one or more banks or arrays of capacitors to store energy and provide power to a utility, home or business, for example. Current from one or more banks or arrays of capacitors 100, 200, 300, 400, 500, 600, 700, subject to surge and transient protection (510) and load control (515) is provided to one or more inverters 520, 530 to generate AC power, also under the control of a controller 525 (with feedback provided through one or more sensors 535, such as a high impedance sampling network).

In summary, the resulting exemplary capacitor 100, 200, 300, 400, 500, 600, 700 embodiments have a structure different from the structures of prior art capacitors, a different fabrication method, and different compositions of matter, with the following nine new and novel features provided as summary highlights. First, the exemplary capacitor 100, 200, 300, 400, 500, 600, 700 embodiments have an additional layer, namely, the free CNTs 130 which are translationally and/or rotationally moveable in an ionic liquid 140. Second, the exemplary capacitor 200, 300, 400, 500 embodiments have a secondary support structure 170, 170A, 170B, 170C for the fixed CNTs 120, which provides a second support to the fixed CNTs 120 at a second location which is separate and spaced apart from a first support location, such as the substrate, and which is not comprised of the fixed CNTs 120 themselves (i.e., the secondary support structure 170, 170A, 170B is in addition to the fixed CNTs 120). Third, the fixed CNTs 120 and the free CNTs 130 are uncapped at least at one end, and have an interior diameter matched to be slightly greater than the ion size of the selected ionic liquid 140. Fourth, the fixed CNTs 120 have not been grown on an electrode or transferred directly from a growth plate, but have been dispersed as CNT-magnetic catalyst nanoparticle structures 175 in an ionic liquid 140 and fifth, deposited with an irregular spacing over a first conductor 110 or conductive substrate 105A. Sixth, the CNT-magnetic catalyst nanoparticle structures 175 are aligned and moved by a magnetic field to couple the magnetic catalyst nanoparticles 125 to the first conductor 110 or conductive substrate 105A. Seventh, the CNT-magnetic catalyst nanoparticle structures 175 in an ionic liquid 140 comprise a new and novel composition of matter. Eighth, a novel conductive nanomesh comprised of deposited nanorods is utilized in exemplary embodiments for coupling CNTs to form fixed CNTs 120A. Ninth, an exemplary capacitor 100, 200, 300, 400, 500, 600, 700 provides greater energy density (or specific energy) than a traditional capacitor, and includes a superposition of energy contributions from multiple sources (e.g., ion movement to and from the exterior of the fixed CNTs 120 and the free CNTs 130 ($\tau_1$), ion movement into and out of the interior of the fixed CNTs 120 and/or the free CNTs 130 ($\tau_2$), and delayed ion movement due to the translational and/or rotational movement of the free CNTs 130 ($\tau_3$)), yielding a device which also exhibits characteristics of a traditional battery while still having the comparatively higher specific power (or power density) and longer cycle life of a traditional capacitor.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. One having skill in the art will further recognize that additional or equivalent method steps may be utilized, or may be combined with other steps, or may be performed in different orders, any and all of which are within the scope of the claimed invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment and not necessarily in all embodiments, and further, are not necessarily referring to the same embodiment. Furthermore, the particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method of fabricating a capacitor, the method comprising:
   depositing a plurality of carbon nanotube-magnetic catalyst nanoparticle structures dispersed in an ionic liquid over a first conductor, the ionic liquid comprising a nonvolatile liquid salt, each carbon nanotube-magnetic catalyst nanoparticle structure comprising a carbon nanotube coupled to a magnetic catalyst nanoparticle, each carbon nanotube of the plurality of carbon nanotube-magnetic catalyst nanoparticle structures substantially coated only by a plurality of ions of the ionic liquid;
   using an applied magnetic field, moving the plurality of CNT-magnetic catalyst nanoparticle structures toward the first conductor and aligning the carbon nanotubes substantially perpendicular to the first conductor;
   coupling the magnetic catalyst nanoparticles to the first conductor to form a first plurality of fixed carbon nanotubes; and
   depositing a first plurality of carbon nanotubes dispersed and moveable in the ionic liquid over the first plurality of fixed carbon nanotubes to form a first plurality of free carbon nanotubes, each carbon nanotube of the first plurality of free carbon nanotubes substantially coated only by a plurality of ions of the ionic liquid.

2. The method of claim 1, wherein prior to the step of depositing a plurality of carbon nanotube-magnetic catalyst nanoparticle structures, the method further comprises:
   providing a porous support structure coupled to the first conductor for supporting the aligned carbon nanotubes substantially perpendicular to the first conductor.

3. The method of claim 2, wherein the step of providing a porous support structure further comprises:
   electrospinning conductive polymer fibers over the first conductor to form the support structure.

4. The method of claim 3, wherein the polymer is at least one polymer selected from the group consisting of: polypyrrole; polianiline; polythiophene; polyterthiophene; derivatives of polythiophene and polyterthiophene; poly(3,4-ethylenedioxythiophene) (PEDOT); poly(3-(4-fluorophenyl)thiophene) (MPFT); poly(3-(3,4-difluorophenyl)thiophene) (MPFT); poly(3-(4-trifluoromethylphenyl)-thiophene) (PTFMPT); poly(1-cyano-2-(2-(3,4-ethylenedioxylthienyl))-1-(2-thienyl)vinylene (ThCNVEDT); poly(3-methylthiophene)(PMeT); and mixtures thereof.

5. The method of claim 2, wherein the step of providing a porous support structure further comprises:
   attaching a screen or a mesh structure over and spaced apart from the first conductor.

6. The method of claim 5, wherein the screen or mesh structure further comprises: a plurality of conductive, elongated nanorod structures chaotically deposited by printing to form the porous support structure, the plurality of conductive, elongated nanorod structures partially coated with a polymer binder to maintain the porous support structure.

7. The method of claim 5, wherein the screen or mesh structure further comprises: a plurality of multiwall or single wall carbon nanotubes chaotically deposited by printing to form the porous support structure, the plurality of conductive, elongated nanorod structures partially coated with a polymer binder to maintain the porous support structure.

8. The method of claim 2, wherein the step of aligning and moving the plurality of CNT-magnetic catalyst nanoparticle structures toward the first conductor further comprises:
   using the applied magnetic field, aligning and moving the plurality of CNT-magnetic catalyst nanoparticle structures through the porous support structure and substantially perpendicular to the first conductor.

9. The method of claim 2, wherein the step of providing a porous support structure further comprises:
   depositing a conductive layer on a prefabricated substrate having a plurality of nanoscale cavities and a nanoscale irregular surface.

10. The method of claim 1, further comprising:
    applying solder over the first conductor.

11. The method of claim 10, wherein the step of coupling the magnetic catalyst nanoparticles to the first conductor to form a first plurality of fixed carbon nanotubes further comprises:
    heating the magnetic catalyst nanoparticles, the solder and the first conductor to bond the magnetic catalyst nanoparticles to the first conductor.

12. The method of claim 1, further comprising:
    coupling a semipermeable membrane over the first plurality of free carbon nanotubes.

13. The method of claim 12, further comprising:
    depositing a second plurality of carbon nanotubes dispersed and moveable in the ionic liquid over the semipermeable membrane to form a second plurality of free carbon nanotubes.

14. The method of claim 13, wherein the first plurality of fixed carbon nanotubes coupled to the first conductor comprises a first electrode, and wherein the method further comprises:
    attaching a second electrode over the second plurality of free carbon nanotubes, the second electrode comprising a second plurality of fixed carbon nanotubes coupled to a second conductor.

15. The method of claim 1, wherein the deposition steps further comprise:
    printing a porous support structure over the first conductor;
    printing the plurality of carbon nanotube-magnetic catalyst nanoparticle structures dispersed in the ionic liquid over the first conductor and the porous support structure; and
    printing the first plurality of carbon nanotubes dispersed and moveable in the ionic liquid over the first plurality of fixed carbon nanotubes.

16. The method of claim 1, wherein the ionic liquid is at least one ionic liquid selected from the group consisting of: butyltrimethylammonium bis(trifluoromethylsulfonyl)imide, 1-ethyl-3-methylimidazolium bis(trifluoromethylsulfonyl)imide, 1-methyl-3-propylimidazolium bis(trifluoromethylsulfonyl)imide, 1-hexyl-3-methylimidazolium bis(trifluoromethylsulfonyl)imide, 1-methyl-3-propylimidazolium iodide, 1-ethyl-3-methylimidazolium thiocyanate, 1-methyl-1-propylpiperidinium bis(trifluoromethylsulfonyl)imide, 1-butyl-2-methylpyridinium bis(trifluoromethylsulfonyl)imide, 1-butyl-4-methylpyridinium bis(trifluoromethylsulfonyl)imide, 1-butyl-1-methylpyrrolidinium bis(trifluoromethylsulfonyl)imide, diethylmethylsulfonium bis(trifluoromethylsulfonyl)imide, lithium bis(trifluoromethylsulfonyl)imide, and mixtures thereof.

17. The method of claim 1, wherein the magnetic catalyst nanoparticle is at least one catalyst selected from the group consisting of: cobalt, molybdenum, nickel, iron, ruthenium, mixtures thereof alloys thereof and their compounds.

18. The method of claim 1, wherein for each fixed carbon nanotube of the first plurality of fixed carbon nanotubes, the magnetic catalyst nanoparticle is coupled to the carbon nanotube at a first end of the carbon nanotube and the carbon nanotube is open or uncapped at a second end opposite the first end coupled to the magnetic catalyst nanoparticle, and wherein each carbon nanotube of the first plurality of free carbon nanotubes is open or uncapped at least at one end.

19. The method of claim 1, wherein each carbon nanotube of the first plurality of fixed carbon nanotubes and each carbon nanotube of the first plurality of free carbon nanotubes has an interior diameter greater than cation or anion diameters of the ionic liquid and smaller than a diameter of two cations or anions of the ionic liquid.

20. A method of fabricating a capacitor, the method comprising:

electrospinning conductive polymer fibers over a first conductor to form a porous support structure support structure;

depositing a plurality of carbon nanotube-magnetic catalyst nanoparticle structures dispersed in an ionic liquid over the porous support structure and the first conductor, the ionic liquid comprising a nonvolatile liquid salt, each carbon nanotube-magnetic catalyst nanoparticle structure comprising a carbon nanotube coupled to a magnetic catalyst nanoparticle, each carbon nanotube of the plurality of carbon nanotube-magnetic catalyst nanoparticle structures substantially coated only by a plurality of ions of the ionic liquid;

using an applied magnetic field, moving the plurality of CNT-magnetic catalyst nanoparticle structures toward the first conductor and aligning the carbon nanotubes substantially perpendicular to the first conductor;

coupling the magnetic catalyst nanoparticles to the first conductor to form a first plurality of fixed carbon nanotubes; and depositing a first plurality of carbon nanotubes dispersed and moveable in the ionic liquid over the first plurality of fixed carbon nanotubes to form a first plurality of free carbon nanotubes, each carbon nanotube of the first plurality of free carbon nanotubes substantially coated only by a plurality of ions of the ionic liquid.

* * * * *